(12) United States Patent
Williams et al.

(10) Patent No.: US 9,192,891 B2
(45) Date of Patent: Nov. 24, 2015

(54) METHOD AND APPARATUS FOR REDUCING $NO_x$ EMISSIONS IN THE INCINERATION OF TAIL GAS

(75) Inventors: William R. Williams, Reading, MA (US); Daxiang Wang, Dracut, MA (US); Theis F. Clarke, Belmont, MA (US)

(73) Assignee: CABOT CORPORATION, Boston, MA (US)

( * ) Notice: Subject to any disclaimer, the term of this patent is extended or adjusted under 35 U.S.C. 154(b) by 386 days.

(21) Appl. No.: 13/883,312

(22) PCT Filed: Nov. 8, 2011

(86) PCT No.: PCT/US2011/059776
§ 371 (c)(1),
(2), (4) Date: May 3, 2013

(87) PCT Pub. No.: WO2012/064734
PCT Pub. Date: May 18, 2012

(65) Prior Publication Data
US 2013/0230432 A1 Sep. 5, 2013

Related U.S. Application Data

(60) Provisional application No. 61/412,823, filed on Nov. 12, 2010.

(51) Int. Cl.
*B01D 53/56* (2006.01)
*C09C 1/48* (2006.01)
(Continued)

(52) U.S. Cl.
CPC ............ *B01D 53/56* (2013.01); *B01D 53/343* (2013.01); *B01D 53/40* (2013.01); *C09C 1/48* (2013.01);
(Continued)

(58) Field of Classification Search
CPC ...... B01D 53/56; B01D 53/343; B01D 53/40; C09C 1/48; C09C 1/50; F23J 15/04; F23G 7/065; F23G 7/06; F23C 9/08
USPC ................. 422/169, 182, 150, 151, 198, 173; 431/5, 115; 423/235, 239.1, 445 R, 423/449.1; 110/204
See application file for complete search history.

(56) References Cited

U.S. PATENT DOCUMENTS 3,873,671 A * 3/1975 Reed et al. ................... 431/5
4,208,386 A 6/1980 Arand et al.
(Continued)

FOREIGN PATENT DOCUMENTS

CN 1012714 A 8/1987
CN 1221483 A 6/1999
(Continued)

OTHER PUBLICATIONS

Japanese Office Action issued in corresponding Japanese Patent Application No. 2013-538830 (English translation), dated Jun. 3, 2014 (8 pages).
(Continued)

*Primary Examiner* — Jill Warden
*Assistant Examiner* — Joye L Woodard

(57) ABSTRACT

Methods for control of $NO_x$ emission in the incineration of tail gas are provided wherein tail gas that comprises $NO_x$, $NO_x$ precursors, or both is introduced into a combustor and diluent is introduced into the combustor for controlling the combustor temperature to a temperature of from about 950° C. to about 1100° C. Methods also are provided for reducing $NO_x$ emissions by controlling air-to-fuel ratio in a tail gas combustor while controlling the combustor flame temperature through diluent injections. A boiler unit for carrying out these methods also is provided. A system for carbon black production using the boiler unit also is provided.

29 Claims, 7 Drawing Sheets

(51) Int. Cl.
  *B01D 53/34* (2006.01)
  *B01D 53/40* (2006.01)
  *C09C 1/50* (2006.01)
  *F23J 15/04* (2006.01)

(52) U.S. Cl.
  CPC . *C09C 1/50* (2013.01); *F23J 15/04* (2013.01); *B01D 2251/2062* (2013.01); *B01D 2251/2067* (2013.01); *B01D 2256/10* (2013.01); *B01D 2257/404* (2013.01); *B01D 2258/0283* (2013.01)

(56) References Cited

U.S. PATENT DOCUMENTS

| 5,296,206 | A | 3/1994 | Cho et al. | |
|---|---|---|---|---|
| 6,383,462 | B1 | 5/2002 | Lang | |
| 6,599,119 | B1* | 7/2003 | Wood et al. | 431/115 |
| 6,702,569 | B2* | 3/2004 | Kobayashi et al. | 431/10 |
| 2004/0086442 | A1 | 5/2004 | Vierheilig | |
| 2008/0233039 | A1 | 9/2008 | Hagemeyer et al. | |

FOREIGN PATENT DOCUMENTS

| DE | 4436389 A1 | 4/1996 |
|---|---|---|
| EP | 0693539 A2 | 1/1996 |
| JP | 63-006315 | 1/1988 |
| JP | 5-106817 | 4/1993 |
| JP | 6-65706 | 9/1994 |
| JP | 10-132241 | 5/1998 |
| JP | 2003-302032 A | 10/2003 |
| WO | 2006-130858 A2 | 12/2006 |

OTHER PUBLICATIONS

International Search Report issued in corresponding International Patent Application No. PCT/US2011/059776 dated Jan. 26, 2012 (3 pages).

International Preliminary Report on Patentability issued in corresponding International Patent Application No. PCT/US2011/059776 dated Mar. 3, 2013 (9 pages).

Amendment Under Articles 34 PCT and 66 PCT and Replacement Sheets issued in corresponding International Patent Application No. PCT/US2011/059776 dated Dec. 18, 2012 (30 pages).

Written Opinion issued in corresponding International Patent Application No. PCT/US2011/059776 dated Oct. 19, 2012 (5 pages).

Office Action received in corresponding Japanese Patent Application No. 2013-538830 dated Feb. 17, 2015 and English translation attached (6 pages).

Second Office Action received in corresponding Chinese Patent Application No. 201180064986.3 dated Jun. 3, 2015 and Search Report attached (English translation only) (5 pages).

* cited by examiner

Table 5

| Example name | 1A (comparative) | 1B (comparative) | 2A (comparative) | 2B (comparative) | 3A | 3B | 4A | 4B |
|---|---|---|---|---|---|---|---|---|
| Relative combustion ratio (Actual air/Air to burn X 100) | 200 | 200 | 137 | 137 | 139 | 140 | 139 | 140 |
| Wet basis O2 in FG, vol% (calculated from relative combustion ratio) | 5.9% | 5.8% | 2.6% | 2.6% | 2.8% | 2.8% | 2.8% | 2.8% |
| FGR flow/Total fresh gas feed | - | - | 0.06 | 0.06 | 0.39 | 0.39 | 0.39(a) | 0.39 |
| SNCR urea rate, kg/hr | - | 217.98 | - | 244.00 | - | 152.33 | - | 152.33 |
| Tail gas flow to boiler Nm3/hr | 57,674 | 58,254 | 41,918 | 41,659 | 42,002 | 42,216 | 42,002 | 42,216 |
| Total air flow to boiler Nm3/hr | 64,086 | 64,490 | 31,979 | 31,654 | 32,584 | 32,868 | 32,584 | 32,868 |
| Steam production rate, kg per hour | 42,692 | 43,197 | 33,078 | 35,671 | 34,612 | 36,054 | 39,804 | 36,054 |
| Incinerator exit temperature, °C [zone B] | 932 | 935 | 1,009 | 1,008 | 905 | 907 | 905 | 907 |
| SNCR inlet temperature, °C [zone C] | 880 | 882 | 852 | 850 | 817 | 819 | 817 | 819 |
| Tail gas NOx, ppmv, dry basis | 94 | 94 | 32 | 32 | 67 | 67 | 67 | 67 |
| Tail gas HCN, ppmv, dry basis | 1,403 | 1,403 | 1,388 | 1,388 | 1,267 | 1,274 | 1,267 | 1,274 |
| Tail gas NH3, ppmv, dry basis | 256 | 256 | 334 | 334 | 315 | 317 | 315 | 317 |
| Total NOx precursors in Tail Gas, ppmv dry | 1,753 | 1,753 | 1,754 | 1,754 | 1,650 | 1,657 | 1,650 | 1,657 |
| Theo. Max NO2, mg/m3, dry basis | 1,455 | 1,458 | 1,893 | 1,919 | 1,770 | 1,774 | 1,770 | 1,774 |
| Incinerator exit NOx, pre-SNCR, mg/m3 | 522 | 522 | 376 | 376 | 246 | 246 | 177 | 246 |
| Final NOx measured at boiler exit, mg/m3, dry basis | 522 | 332 | 376 | 146 | 246 | 199 | 177 | 199 |
| Theo. Max NO2, kg/hr (total N in TG to NOx) | 121 | 122 | 88 | 87 | 83 | 84 | 83 | 84 |
| kg Urea/kg theo NO2 | - | 0.71 | - | 1.12 | - | 0.73 | - | 0.11 |
| kg Urea/kg NO2 removed in SNCR | N/A | 5.47 | N/A | 9.34 | N/A | 27.50 | N/A | 1.30 |
| % Urea utilization | N/A | 12% | N/A | 7% | N/A | 2% | N/A | 50% |
| % NOx precursors converted to NOx in boiler | 35.9% | 35.8% | 19.9% | 19.6% | 13.9% | 13.9% | 11.8% | 13.9% |
| % NOx destroyed in SNCR | 0.0% | 36.4% | 0.0% | 61.1% | 0.0% | 19.0% | 0.0% | 61.1% |
| Overall % NOx precursors converted to NOx (boiler + SNCR) | 35.9% | 22.8% | 19.9% | 7.6% | 13.9% | 11.2% | 11.8% | 5.4% |
| % reduction of NOx relative to case 1A (based on NPC to NOx yield) | 0.0% | 36.5% | 44.6% | 78.8% | 61.2% | 68.7% | 67.1% | 84.9% |

Examples

Fig. 10

METHOD AND APPARATUS FOR REDUCING NO$_x$ EMISSIONS IN THE INCINERATION OF TAIL GAS

This application is a National Stage Application of PCT/US2011/059776, filed Nov. 8, 2011, which claims the benefit under 35 U.S.C. §119(e) of prior U.S. Provisional Patent Application No. 61/412,823, filed Nov. 12, 2010, which is incorporated in its entirety by reference herein.

BACKGROUND OF THE INVENTION

The present invention relates to methods for reducing NO$_x$ emissions in the incineration of tail gas. The present invention also relates to an apparatus for reducing NO$_x$ emissions in the incineration of tail gas.

Carbonaceous fuels and other organic material are combusted in a wide variety of industrial processes. Furnace reactors, combustion engines, combustion chambers, boilers, furnaces, heaters, hot gas generators, burners, waste incinerators, and the like, are used to combust carbonaceous fuels. This combustion equipment may be used to make energy, incinerate waste and byproduct materials, or both. During a typical combustion process within a furnace or boiler, for example, a hydrocarbon feedstock or fuel is combusted in the presence of oxygen, and a flow of a combustion exhaust gas is produced. Carbonaceous fuels can be made to burn more completely, and with reduced emissions of carbon monoxide (CO) and unburned hydrocarbons, when excess air is used. Excess air usage can permit higher flame temperatures. Unfortunately, combustion at high temperatures can generate nitrogen oxides (often referred to as NO$_x$). Free radicals of nitrogen and oxygen in air can react at such high combustion temperatures to form thermal NO$_x$. NO$_x$ may also be formed as the result of oxidation of nitrogen containing species in the fuel, such as those that may be found in heavy fuel oil, municipal solid waste, and coal. Emissions of NO$_x$ are controlled by laws, directives, regulations and the like at many locations of operation of combustion equipment throughout the world. An exhaust aftertreatment may be required for combustion equipment at a given location to attain lower, compliant NO$_x$ emission levels.

Previous exhaust aftertreatment techniques tend to reduce NO$_x$ using various chemical or catalytic methods. Such methods include, for example, nonselective catalytic reduction (NSCR), selective catalytic reduction (SCR), and selective noncatalytic reduction (SNCR). Such aftertreatment methods typically require some type of reactant for removal of NO$_x$ emissions. The NSCR method can involve using unburned hydrocarbons and CO to reduce NO$_x$ emissions in the absence of O$_2$. Fuel/air ratios must be controlled to ensure low excess O$_2$. Both reduction and oxidation catalysts are needed to remove emissions of CO and hydrocarbons while also reducing NO$_x$. Combustion exhaust containing excess O$_2$ generally requires chemical reductant(s) for NO$_x$ removal. Among the selective processes, SCR processes can involve passing a nitrogen oxides-laden effluent across a catalyst bed in the presence of ammonia, to achieve NO$_x$ reductions. With respect to SCR, the installation and operational costs of the catalyst system may not be economical. SNCR processes can involve the introduction of NO$_x$-reducing treatment agents into the effluent in the absence of catalyst and elevated temperature to achieve NO$_x$ reductions. With respect to previous SNCR, concerns have been raised about problems of NH$_3$ breakthrough and byproduct CO emissions.

In some industries, such as in carbon black production, refinery operations, or petrochemical operations, for example, exhaust gases generated in primary process units are conveyed to burners or boilers for energy production, heat recovery, or incineration. These operations can generate emissions, which can be subject to any applicable air quality controls or requirements. A furnace carbon black producing process, for example, typically employs a furnace reactor having a burner or combustion chamber followed by a reactor. A combustion gas feed stream, typically a hydrocarbon gas stream such as natural gas, or the like, is combusted in the burner portion along with an oxidant feed gas stream such as air or oxygen, to produce hot combustion gases which pass then to the reactor portion of the furnace. In the reactor, hydrocarbon feedstock is exposed to the hot combustion gases. Part of the feedstock is burned, while the rest is decomposed to form carbon black, hydrogen, and other gaseous products. The reaction products typically are quenched, and the resulting carbon black and off-gas mixture is conveyed to a bag collector or other filter system, whereupon the carbon black content is separated from the tail gas. The recovered carbon black typically is finished to a marketable product, such as, for example, by pulverizing and wet pelletizing. Water from the pelletizing typically is driven off with a dryer, which may be gas-fired, oil-fired, process-gas fired such as with tail gas, or combinations of these. The dried pellets can then be conveyed from the dryer to bulk storage or other handling. The dryer also can generate gaseous emissions. The principal source of emissions in the carbon black furnace process typically is from the tail gas. Other than direct venting, tail gas emissions have been discharged using flares. The tail gas can contain combustible gas components. The composition of the tail gas after separation of the carbon black and prior to any aftertreatment may vary according to a grade of carbon black being produced and other process parameters. The untreated tail gas from carbon manufacture typically may include combinations of particulate matter, carbon monoxide (CO), thermal nitrogen oxides, sulfur compounds, polycyclic organic matter, trace elements, and other components.

The present inventors have recognized that gases containing nitrogenous byproducts of combustion in some applications may include NO$_x$ precursors which also can pose a concern for NO$_x$ emission control. The present inventors have recognized that a tail gas stream from a furnace carbon black production process, for example, can contain fuel-derived NO$_x$ precursors which have not been previously fully appreciated or resolved. Further, the present inventors believe that methods and systems for comprehensively controlling nitrogen oxides as well as nitrogen oxide precursors in combustion effluents have not been previously developed, nor have the possible benefits of such methods and systems previously been fully realized or attainable, until the development of the present methods and arrangements.

SUMMARY OF THE PRESENT INVENTION

Accordingly, a feature of the present invention is to reduce NO$_x$ emissions in the incineration of tail gas.

Another feature of the present invention is to reduce NO$_x$ emissions in the incineration of tail gas produced from a process comprising combustion.

An additional feature of the present invention is to reduce NO$_x$ emissions in the incineration of tail gas from carbon black production.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates, in part, to a method for reducing $NO_x$ emissions in the incineration of tail gas, comprising introducing tail gas into a combustor having a combustor temperature, wherein the tail gas comprises $NO_x$, $NO_x$ precursors, or both, and x is a positive value, and introducing diluent into the combustor for controlling the combustor temperature to a temperature of from about 950° C. to about 1100° C. The source of the tail gas can be any process that comprises combustion of a combustible material in air or other oxygen source.

The present invention further relates to the indicated method for reducing $NO_x$ emissions which further comprises conducting effluent from the combustor to at least one selective non-catalytic reduction unit having a temperature of from about 850° C. to about 1100° C. for further $NO_x$ emission reduction.

The present invention also relates to the indicated method for reducing $NO_x$ emissions which further comprises introducing at least one $NO_x$ reducing agent to the at least one selective non-catalytic reduction unit, the combustor, or both, wherein the $NO_x$ reducing agent or decomposition products thereof or both react with $NO_x$ to produce nitrogen included with flue gas discharged from the at least one selective non-catalytic reduction unit.

The present invention further relates to the indicated method for reducing $NO_x$ emissions wherein the diluent comprises 25% or more on a gravimetric rate basis of total flue gas discharged from at least one selective non-catalytic reduction unit. At least a portion of a $NO_x$ reducing agent can be introduced directly in the at least one selective non-catalytic reduction unit in combination with such a rate of flue gas recirculation to the combustor.

The present invention further relates to the indicated method for reducing $NO_x$ emissions in which the diluent can comprise flue gas from a carbon black dryer. At least a portion of the $NO_x$ reducing agent can be introduced in the combustor in combination with such an introduction of dryer flue gas.

The present invention further relates to the indicated method for reducing $NO_x$ emissions wherein at least about a 10% reduction, on a gravimetric rate basis, in $NO_x$ in the flue gas can be obtained relative to $NO_x$ in the flue gas obtained with the combustor operated at a temperature of about 1200° C.

The present invention also relates to methods for reducing $NO_x$ emissions by controlling air-to-fuel ratio in a tail gas combustor while controlling the combustor flame temperature through diluent injections, with flue gas concentrations of oxygen being less than about 8 vol %, or less than about 5 vol %, or less than about 3 vol %.

The present invention also relates to an apparatus for carrying out methods for incineration of tail gas, such as above-described, comprising (i) a combustor operable for receiving: (a) tail gas comprising $NO_x$, $NO_x$ precursors, or both, and (b) diluent of type(s) and amount(s) for controlling combustor temperature to from about 950° C. to about 1100° C.; and (ii) at least one selective non-catalytic reduction unit operable for receiving effluent discharged from the combustor and at least one $NO_x$ reducing agent or decomposition products thereof or both reactable with $NO_x$ to produce nitrogen included with flue gas discharged from the at least one selective non-catalytic reduction unit. The apparatus can be used for incineration of tail gas from carbon black production or other processing involving combustion of fuels or other combustible materials.

For purposes herein, "tail gas" can generally refer to gaseous exhaust or effluent of any processing unit or equipment used for incinerating hydrocarbonaceous material, unless indicated otherwise.

"Incinerating" can refer to burning, combusting, pyrolyzing, charring, or any combinations thereof, unless indicated otherwise.

"Control", with respect to incineration associated with tail gas, refers to at least reducing the level of $NO_x$ that otherwise occurs without the preventive step(s).

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention. Similar numeral identifiers used in the figures refer to similar features.

BRIEF DESCRIPTION OF DRAWINGS

FIG. 10 shows Table 5 which is a summary of the results of the examples described herein.

DETAILED DESCRIPTION OF THE PRESENT INVENTION

Figure 1:
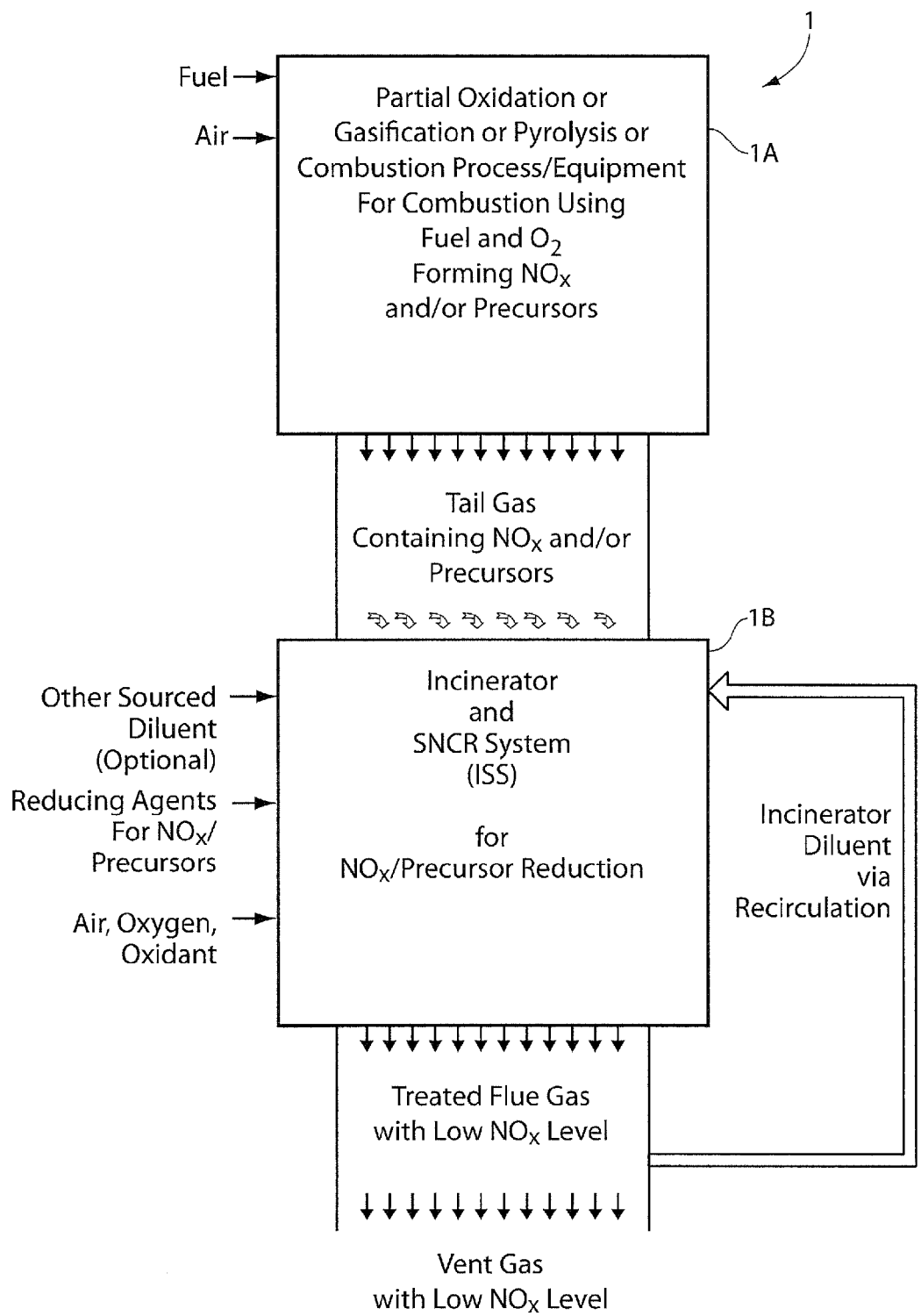
FIG. 1 is a block diagram showing a generalized process for aftertreatment of tail gas from combustion equipment to reduce nitrogen oxides in the tail gas according to an example of the present invention.

The present invention relates to reducing $NO_x$ in the incineration of tail gas wherein a diluent is introduced to moderate the incineration temperature and control production of $NO_x$. Nitrogen oxide emissions do not arise from thermal $NO_x$ alone, or even primarily so, in some commercially significant tail gases produced by combustion operations. Tail gas production from carbon black production, for example, can carry fuel nitrogen as a mix of $NO_x$ precursors (e.g., ammonia, HCN, etc.), referred to herein as "NPCs". NPCs can be oxidized to $NO_x$ in incinerators, unless abated by methods of the present invention. Methods of the present invention can control tail gas incineration operations effective to reduce $NO_x$ emissions attributable to any one or more of NPCs, thermal oxides, and $NO_x$ having any other origins. Thermal $NO_x$, for example, can be a minority reaction or source of $NO_x$ occurring in the incinerating of a tail gas that is abated in methods of the present invention. NPCs can be the predominant source of $NO_x$ production in the incinerating of a tail gas that is abated in methods of the present invention. The incinerating of the tail gas in methods of the present invention can occur in the substantial absence of thermal $NO_x$ (e.g., thermal $NO_x$ being less than about 10%, or less than about 5%, or less than about 1%, all by weight, of total $NO_x$) or the complete absence of thermal $NO_x$. Thermal $NO_x$ can be the predominant (i.e., 50% or more) form of $NO_x$ that is controlled in the incineration of a tail gas in a method of the present invention.

The treatment of combustion tail gas to reduce $NO_x$ emissions can be done with the incinerator (also referred to herein as a "combustor") alone or with arrangements combining an incinerator and at least one selective non-catalytic reactor (SNCR). The incinerator generally has at least one oxygen containing source fed into the incinerator for combustion of the tail gas. A diluent is introduced at the tail gas incinerator adequate to lower or control the incinerator temperature to approximately 950° C. to about 1100° C. In this temperature range, for example, it has been found that $NO_x$ emissions from tail gases from carbon black production and other combustion-involved processing can be reduced. Further, these temperature reductions at the combustor can be controlled to values, for example, that also are useful for efficient operation at the SNCR. The diluent typically is gaseous, or a material (e.g., a liquid suspension) convertible to a gaseous-like state upon introduction into elevated temperatures within an incinerator, but the diluent is not limited to these types. The source of the diluent can be, for example, process gas or process additives available at a lower temperature than the incineration temperature, or otherwise can act, for example, as a heat sink within the incinerator. Further, both use of combustor temperature reduction and an SNCR can reduce $NO_x$ emissions from tail gas. In general, an SNCR operates by spraying a solution of reducing agent into a gas stream coming from the combustor. One or more nozzle arrays provided in the SNCR can be used for such spraying. The SNCR typically, but not necessarily in all cases, has an ideal operating temperature for $NO_x$ removal for a tail gas that can tend to range lower than the ideal range of temperature for incineration at the incinerator for $NO_x$ control. Recycle of flue gas discharged from the SNCR at lower temperature back to the incinerator provides one efficient approach to introduce a temperature moderating-diluent at the incinerator. In addition, or alternatively, flue gas from other process units, such as a pellet dryer in carbon black production plant, can be used as a source of diluent for introduction at the tail gas incinerator. Further, the diluent introduction at the incinerator can be done in conjunction with introduction of $NO_x$ reducing agent (e.g., urea, ammonia solution) at an SNCR, if used in combination with the incinerator, or at the incinerator, or both, to further lower $NO_x$ emissions. Reductions in incinerator temperature by introduction of the diluent at the incinerator can make it possible to introduce reducing agent in the incinerator, directly or via recycled flue gas thereto.

FIG. 1 shows an example of a generalized process 1 of the present invention for aftertreatment of tail gas from combustion equipment in an incinerator and SNCR system ("ISS") to reduce nitrogen oxides and precursors thereof in the tail gas. In block 1A, fuel is combusted in combustion equipment (or partial oxidation, gasification, or pyrolysis equipment) under conditions tending to form $NO_x$, precursors of $NO_x$, or both. In block 1B, tail gas exhausted from the combustion equipment (e.g., carbon black reactor and the like) is introduced into an aftertreatment system comprising an incinerator and SNCR. Diluent is introduced into the incinerator of the ISS to reduce the incinerator temperature to a temperature effective to reduce $NO_x$ in the tail gas (e.g., about 950° C. to about 1100° C.). The diluent can be, for example, recycled treated tail gas or diluent sourced external of the ISS. Nitrogen oxide reductant can be introduced to the ISS for removal of $NO_x$, precursors of $NO_x$, or both, to provide a treated vent gas with a lower $NO_x$ level. Air or other oxygen containing source (e.g., oxygen, oxidant) can be introduced into the incinerator at any point or multiple points, for instance, in an amount sufficient for at least complete or almost complete combustion of the tail gas. Although use of an SNCR, such as shown in FIG. 1, preferably can be included to augment $NO_x$ reductions already obtained at the incinerator by methods of the present invention, such combined used is not necessarily required to meet the particular $NO_x$ reduction needs of every situation. For example, examples of the present invention are shown herein where diluent for the incinerator can be sourced elsewhere from recirculated flue gas exiting an SNCR.

The type of combustion equipment to which the $NO_x$ controlling aftertreatment of the present invention can be applied is not necessarily limited and can encompass any device or process unit that combusts a material in the presence of air or other oxygen source to produce at least one gaseous product that is $NO_x$ and/or a precursor thereof. The combustion equipment can be, for example, a furnace reactor, a petrochemical process unit, a boiler, a furnace, a burner, a waste incinerator, an internal combustion engine, a combustion chamber for a marine application, a hot gas generator, and the like. The combustion equipment can be used, for example, for a chemical reaction or reactions, electricity generation, heat generation, power generation, mechanical work generation, and other applications. The combustion devices and units typically are used to combust a hydrocarbon-containing material, such as hydrocarbonaceous fuel (e.g., oil, gas, and/or solid forms), but are not limited thereto. A combustion fuel can be, for example, gases such as methane, propane, butane, acetylene; liquids such as fuel oils, gasoline, diesel fuel; or solids such as coal, or other fuels. Organic solid wastes, such as paper products, may be used as the combustible material.

Without desiring to be bound to a particular theory, the $NO_x$ reducing effects of the methods and systems of the present invention can be further understood in view of the following discussions of $NO_x$ formation in carbon black processing, as an example, and manipulations thereof for purposes of the present invention.

For purposes herein, $NO_x$ is an umbrella term referring to all oxides of nitrogen. The exact nature of the $NO_x$ can vary depending on ambient conditions and oxygen level. Normally, $NO_x$ is formed as NO but, once in the atmosphere, most of the $NO_x$ is converted to $NO_2$. Because of this, most environmental authorities will use $NO_2$ equivalent concentrations for reporting. This convention is followed herein.

Without desiring to be bound, there are thought to be at least three $NO_x$ formation mechanisms potentially associated with carbon black production:

1) Thermal $NO_x$.

At high temperatures (>1500° C.), nitrogen and oxygen in air will react to form $NO_x$. High heating value fuels like natural gas can create flame temperatures that exceed these temperatures. So, for example, natural gas-fired carbon black burners do make thermal $NO_x$. However, tail gas, such as exemplified in the examples herein, has a low heating value; its adiabatic flame temperature below 1400° C., so thermal $NO_x$ is not an issue with tail gas incinerators, dryers, or flares (as long as no natural gas is co-fed).

2) Fuel $NO_x$.

This can be the predominant source of $NO_x$ in furnace carbon black processing plants, for example, such as the one exemplified in the examples herein. Fuel $NO_x$ comes from the nitrogen in the feedstock. In normal fuel combustion (e.g. coal), the mechanism is simple: N in the feedstock is oxidized directly to $NO_x$. In carbon black production, there is an additional step. Because the carbon black production is a mix of feedstock oxidation, pyrolysis, and hydrolysis, the carbon black reaction liberates reduced nitrogen species like HCN and $NH_3$ in addition to $NO_x$. Thus, tail gas in furnace carbon black production such as exemplified herein carries the fuel nitrogen as a mix of $NO_x$ precursors ("NPCs"). These NPCs are then oxidized to $NO_x$ in the tail gas incinerator(s).

3) Prompt $NO_x$.

This is formed when hydrocarbon free radicals formed in combustion react with nitrogen. This is generally thought to be an insignificant contributor relative to fuel and thermal $NO_x$. This is especially the case for tailgas from carbon black process, as it can contain negligible hydrocarbons While not desiring to be bound to any particular theories, $NO_x$ formation in a furnace carbon black plant can occur, for example, in two distinct steps:

Step 1. Carbon Black Reactor and Burner:

Thermal $NO_x$ from a carbon black reaction and feedstock nitrogen, FSN, can be converted in a carbon black reactor to form HCN, $NH_3$, and $NO_x$ and a small amount of $N_2$. Nitrogen in precursors in a tailgas stream can directly affect $NO_x$ emission from tailgas combustion. It is necessary to quantify the content of nitrogen precursors in a tailgas stream. This quantification can be expressed as follows:

$$Y_1 = (F_{N,NPCs})/(F_{N,feedstock} + F_{NOx,P}) \quad (1)$$

where $F_{N,NPCs}$ is the mass or molar flow of the NPCs ($NH_3$, HCN, $NO_x$) in the tail gas, $F_{N,feedstock}$ is the mass or molar flow of the N atoms in the feedstock. $F_{NOx,P}$ is the molar flow of $NO_x$ in the burner.

The amount of $NO_x$ formed in the reactor that is from burner thermal $NO_x$ or fuel NOx may not always be known. The extra or thermal $NO_x$ from the carbon black burner can make $Y_1$ exceed 100%. It can be sufficient to know what the inlet feed of NPCs is for purposes of understanding the impact that the incineration has on the final outcome of $NO_x$ level in Step 2.

Step 2: Tail Gas Incineration:

In this step, the NPCs are oxidized to $NO_x$. However, the $NO_x$ can then further react with the NPCs to form $N_2$. It is this second reaction that is desirable to promote in the incinerator, in order to minimize the second step $NO_x$ formation efficiency:

$$Y_1 = \frac{F_{N,NOx}}{F_{N,NPCs}}, \quad (2)$$

where $F_{N,NOx}$ is the N mass or molar flow in the flue gas $NO_x$.

With a detailed knowledge of both steps, and the effect of operating conditions on $Y_1$ and $Y_2$, one is able to accurately predict the $NO_x$ emissions as a function of feedstock nitrogen, using the combined equation:

$$F_{N,NOx} = Y_1 \cdot Y_2 \cdot (F_{N,feedstock} + FNO_{x,P}) \quad (3)$$

A functional map of $Y_2$ versus operating conditions of a tail gas incinerator can be developed. To do this, NPCs can be measured, for example, with or without modeling or analysis of the $Y_1$ versus carbon black reactor operation When $NO_2$ concentrations and flows are measured, such as in the examples herein, the N balance can be expressed in terms of equivalent levels of $NO_2$. So instead of expressing NPCs in the tail gas and nitrogen content in the feedstock as N mols or kg, theoretical maximum $NO_2$ levels can be calculated as if all the N in the FS or TG would convert to $NO_2$ in the flue gas (i.e., $Y_1 = Y_2 = 1$), and as done in the examples herein.

In the present invention, $NO_x$ reduction can be accomplished by prevention, using better combustion techniques, or by remediation, using either urea or ammonia as a $NO_x$ reducing agent, or combinations of both. In either the case of prevention or remediation, the same reactions can be optimized to minimize $NO_x$ formation, and to maximize $NO_x$ destruction. The key reactions can be as follows:

A thermal $NO_x$ formation reaction, which typically is not significant at tail gas incineration temperatures such as 950° C. to 1100° C.:

$$N_2 + O_2 \rightarrow 2NO \quad (4);$$

fuel $NO_x$ formation reactions:

$$NH_3 + 5/4 O_2 \rightarrow NO + 3/2 H_2O \quad (5)$$

$$HCN + 7/4 O_2 \rightarrow NO + \tfrac{1}{2} H_2O + CO_2 \quad (6); \text{ and}$$

$NO_x$ destruction reactions:

$$NH_3 + NO + \tfrac{1}{4} O_2 \rightarrow N_2 + 3/2 H_2O \quad (7)$$

$$HCN + NO + \tfrac{3}{4} O_2 \rightarrow N_2 + \tfrac{1}{2} H_2O + CO_2 \quad (8)$$

$$CO + NO \rightarrow \tfrac{1}{2} N_2 + CO_2 \quad (9).$$

With respect to remediation by selective catalytic reduction (SCR) and selective non-catalytic reduction (SNCR), in SCR and SNCR either ammonia or urea can be injected into a stream containing $NO_x$. If urea is used, it is decomposed in situ to ammonia, so in either case $NO_x$ is reduced via reaction (7) above. Oxygen is required to run this reaction. Normal oxygen levels present in flue gas are sufficient because they are present in excess of the $NO_x$ normally seen in flue gas. In competition with the desired reduction reaction, there is the indicated oxidation reaction (5). This reaction forms NO instead of destroying it. At temperatures higher than 1000° C., the ammonia oxidation reaction becomes faster. This can limit operating temperatures to below 1000° C. For SNCR, this can present a problem, however, because as temperatures are reduced at the incinerator, kinetics quickly become too slow to run any reaction at the SNCR, and the reactor neither can destroy $NO_x$ nor $NH_3$, so $NO_x$ is not removed, and unreacted $NH_3$ "slips" out of the reactor. This effectively can create a narrow window of operation for an SNCR between about 850° C. and 1000° C. It also can limit the efficacy of an SNCR. In practice, SNCR vendors typically do not guarantee any more than 70% $NO_x$ destruction, and for lower $NO_x$ concentrations (<150 mg/m$^3$), often guarantee only 35-40%. In order to improve $NO_x$ reduction beyond 70%, SCR can be required. SCR uses a catalyst to accelerate the kinetics. SCR is typically run at much lower temperatures (200-400° C.), so there is no problem with the high temperature limit that exists with the SNCR. SCR can be costlier than SNCR, so remediation that can use SNCR is preferred.

Another important process variable affecting $NO_x$ formation can be air-to-fuel ratio in the combustor. Higher excess $O_2$ in the flame promotes $NO_x$ formation reactions (4) and (5) more than it does for SCNR reactions (7) and (8). Air-to-fuel ratios also affect combustion temperature, which in turn affect $NO_x$ formation. The present invention decouples these two factors and minimizes $NO_x$ reduction.

While not desiring to be bound to a particular theory, because $NO_x$ formation from tail gas incineration is dominated by fuel $NO_x$ in carbon black production, for example, the present inventors have found that the same kinetics and optimization strategy used in SNCR design can be applied to preventing $NO_x$ generation from NPCs at the incinerator. For example, if enough residence time in the incinerator is provided, and temperatures in the combustion chamber are kept below 1100° C., $NO_x$ emissions can be reduced. Dilution gases can be used as diluent to moderate the incinerator temperature in this respect. Good mixing in the combustor can assist in preventing hot spots within the incinerator. As sources of such dilution gases, dilution gases from flue gas recirculation, carbon black dryer flue gases, or both, can be used to moderate incinerator temperature, but are not limited thereto. Excess air may not be preferred as a diluent for several reasons. First, it can reduce boiler efficiency because the air has to be heated using either combustion energy or tail gas heat, all of which would normally go to making steam. Second, excess air can accelerate the oxidation of CO, and this can reduce or stop the kinetics of indicated reaction (9), which is an important additional route for reducing $NO_x$. Therefore, a preferred method of temperature reduction in a tail gas combustor (incinerator) is flue gas recirculation, such as from an SNCR unit or carbon black dryer flue gas, or other process flue gases. While not desiring to be bound to any particular theory, it also is thought that air and fuel staging may further improve $NO_x$ reductions, such as by equipping an incinerator with multiple, e.g., primary and secondary, air injection points. This can be done in such a way that some of the $NH_3$ and HCN are oxidized to form $NO_x$ in the first stage to create a balanced mixture of NH-3/HCN and $NO_x$, which can react via indicated reactions (5) and (6) in the second oxidation stage to make $N_2$.

As indicated, the source of the tail gas to be treated for $NO_x$ reduction according to the present invention can be a process unit or units used for a chemical reaction or reactions with at least some combustion involved, such as carbon black production.

Figure 2:
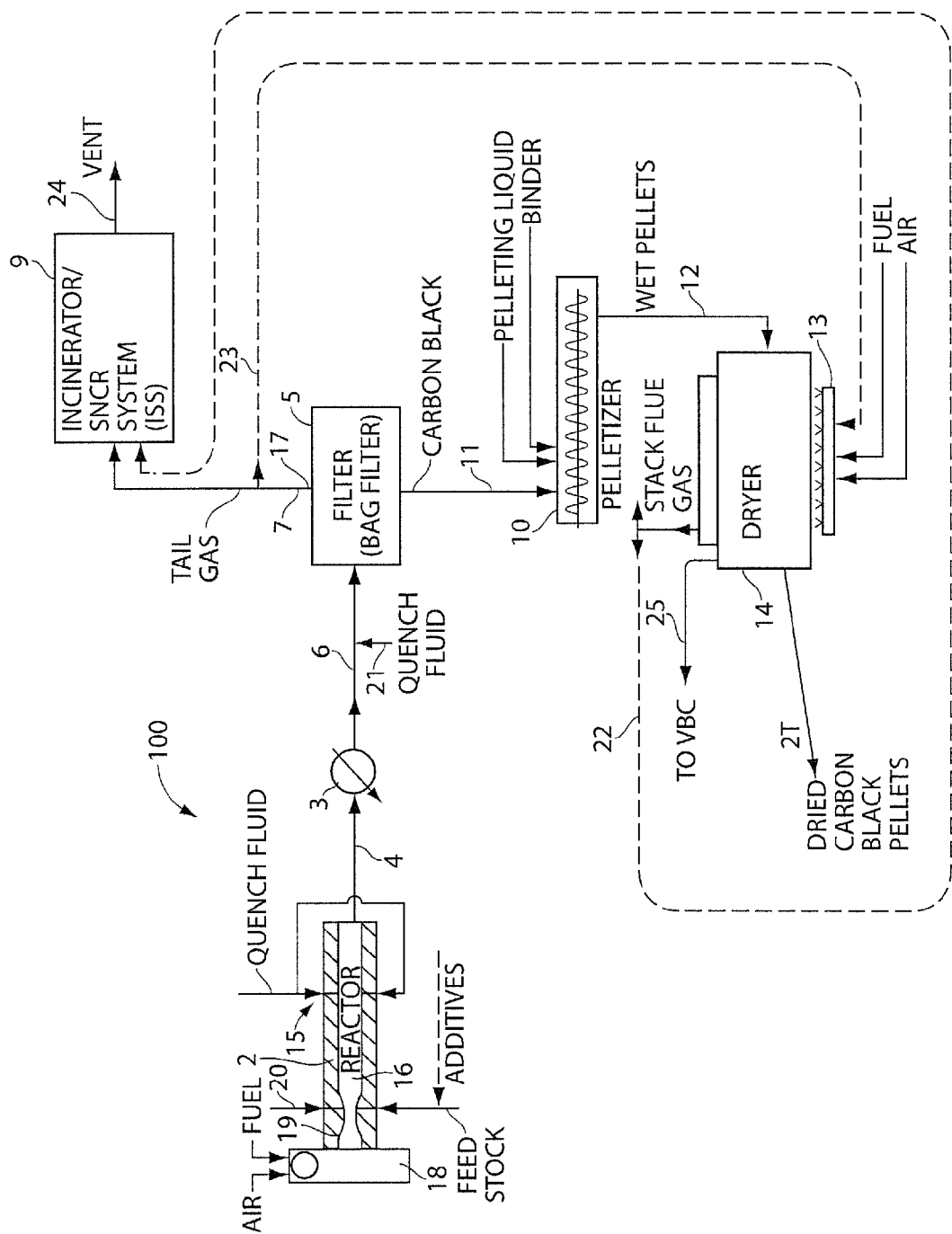
FIG. 2 is process flow diagram showing a process for production of furnace carbon black including an aftertreatment system for tail gas for reducing nitrogen oxide emissions according to an example of the present invention.

In FIG. 2, for example, the reference numeral 100 designates generally an apparatus or system for producing carbon black which includes an aftertreatment system 9. The apparatus 100 can include, for example, a furnace type reactor 2 which can be of a type known in the art, a filter 5 for separating carbon black 11 from off gas or tail gas 7 from the quenched reactor smoke 6, a pelletizer 10, an oven-fired dryer 14 for forming dried carbon black pellets 27, and an incinerator and SNCR system ("ISS") 9 for aftertreatment of the tail gas 7 to reduce $NO_x$ emissions from the apparatus. The ISS 9 is used to reduce nitrogen oxide emissions in tail gas 7 before vented to the atmosphere as gaseous emissions 24. As indicated, the ISS 9 provides for treatment of tail gas with diluent introduced at an incinerator and introduction of $NO_x$ reducing agent in arrangements also including an SNCR effective to lower $NO_x$ emissions. As indicated options shown by dashed lines, a portion 22 or all of the stack flue gas of the dryer 14 can be diverted to the ISS 9, and a portion 23 of tail gas 7 can be diverted to an oven 13 for the dryer 14.

With further respect to other components shown for the apparatus 100, the reactor 2 has the exhaust thereof connected to cooling means 3 by a conduit 4 with the cooling means (e.g., a heat exchanger) 3 being connected to the downstream filter means 5 by a conduit 6 and the filter 5 is provided with a vent 17 for the release of the tail gas 7. The filter 5 is also connected to a downstream pelletizer 10 by a conduit 11 through which the recovered carbon black is passed. As shown, pellets which are produced in the pelletizer 10 can be conducted via a conduit 12 to the dryer 14 which can be a type known in the art. Steam and carbon black dust also can be exhausted from dryer 14 via conduit 25 to a filtering means, such as a known vapor bag collector or "VBC" (not shown).

The reactor 2 can be a type known in the art and is comprised of a precombustion zone 18 into which air and fuel are introduced for combustion or into which hot combustion gases are charged, with the precombustion zone 18 communicating with the reaction zone 16. A throated portion having a converging diameter or venturi 19 can be provided in the reaction zone 16. In the type of reactor disclosed, a carbon black forming hydrocarbon is pyrolyzed by contact with the hot combustion gases, with the hydrocarbon feedstock being introduced by injection means 20. As indicated in the figure, one or more types of additives can optionally be introduced along with the feedstock in the reactor. In the reactor disclosed, the smoke produced by the hot combustion gases and the pyrolyzed hydrocarbon flows along the reaction zone 16. The hot smoke contains solid carbon black particles and it is desired to cool the hot smoke to a temperature sufficiently low to stop the carbon black production reaction at a predetermined stage. Inlet 15 communicates with the reactor 2 to provide an inlet for introducing a quench fluid into a reaction zone 16 of the reactor 2. The injection location/zone 15 is shown at a position downstream of the reactor venturi 19. Injection location 15 provides a prequench of the hot smoke to stop or retard the carbon black forming process. The reaction zone 16 communicates with the conduit 4 whereby quenched smoke, which contains solid carbon black particles in suspension, is discharged from the reaction zone to the conduit 4. Further cooling before filtering can be effected by cooling zone/device 3. The cooling zone/device 3 can be of any suitable type including those known and used in the art for this function. Any additional final cooling can be effected by injecting additional quench water by way of conduit 21 into the smoke in conduit 6 between cooling zone/device 3 and filter 5.

The filter 5 can be, for example, a collector bag or other filter, or a cyclone, precipitator, or other separation unit known in the art. However, it is to be understood that any type of suitable filter or gas-solids separator can be used. As indicated, the function of the filter 5 is to separate the carbon black particles from the remaining constituent parts of the hot smoke with the carbon black then being conducted to the pelletizer 10, which can be a type known in the art, and the remaining constituent parts of the smoke are exhausted through the vent 7. The dryer 14 can be, for example, a carbon black pellet dryer known in the art. The dryer heat can be provided, for example, by oven 13 which combusts fuel (e.g., methane, fuel oil, etc.), tail gas, or both. As indicated, a portion of the tail gas 7 can be used as fuel gas for the oven dryer 13. Additional aspects and features which can used in the ISS 9 shown in FIG. 2 are discussed herein with reference to the following figures.

Figure 3:
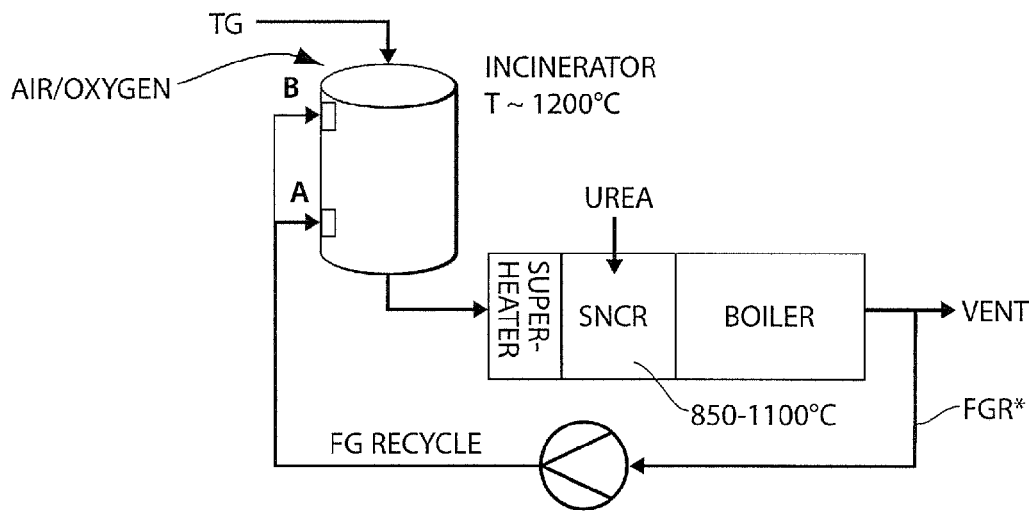
FIG. 3 is a process flow diagram showing a comparison aftertreatment system for tail gas including an incinerator and SNCR system.
Figure 4:
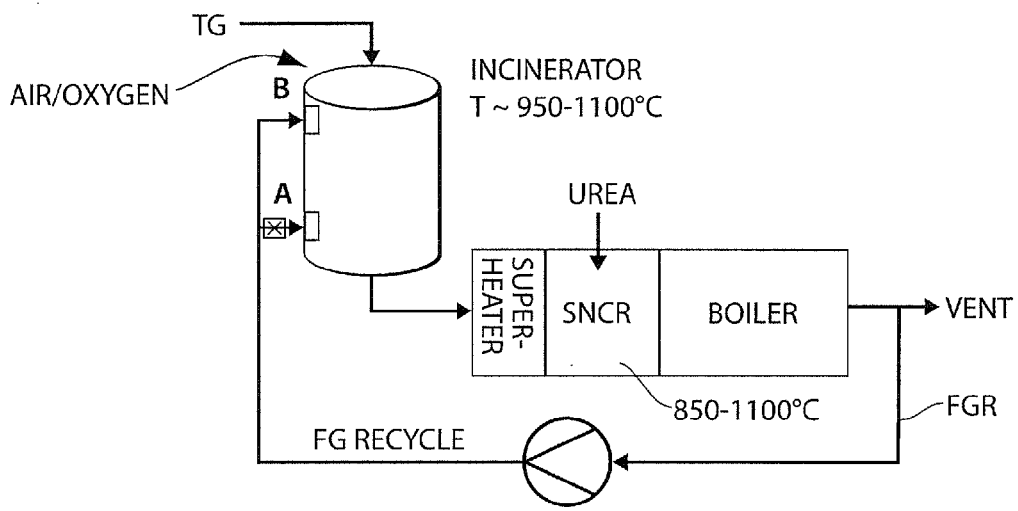
FIG. 4 is a process flow diagram showing an aftertreatment system for tail gas including an incinerator and SNCR system according to an example of the present invention.
Figure 5:
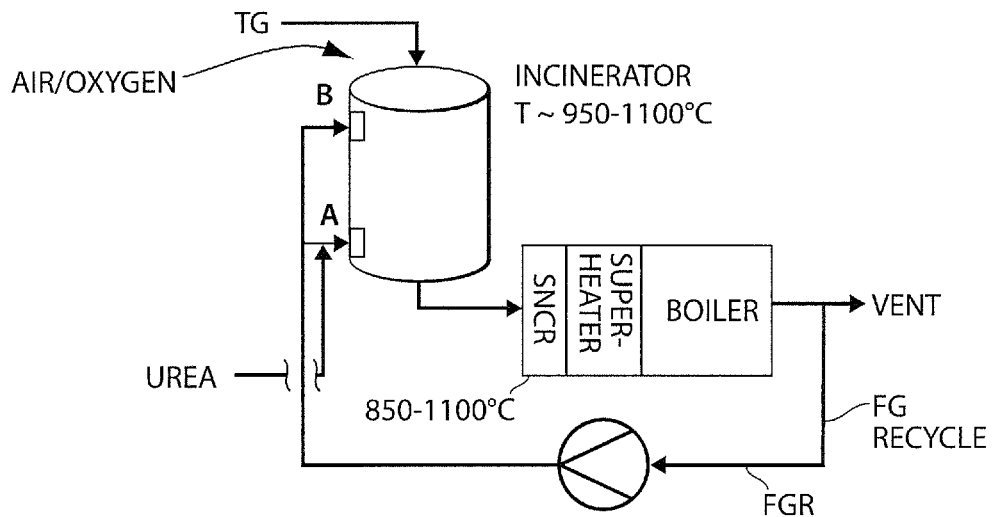
FIG. 5 is a process flow diagram showing an aftertreatment system for tail gas including an incinerator and SNCR system according to an example of the present invention.
Figure 6:
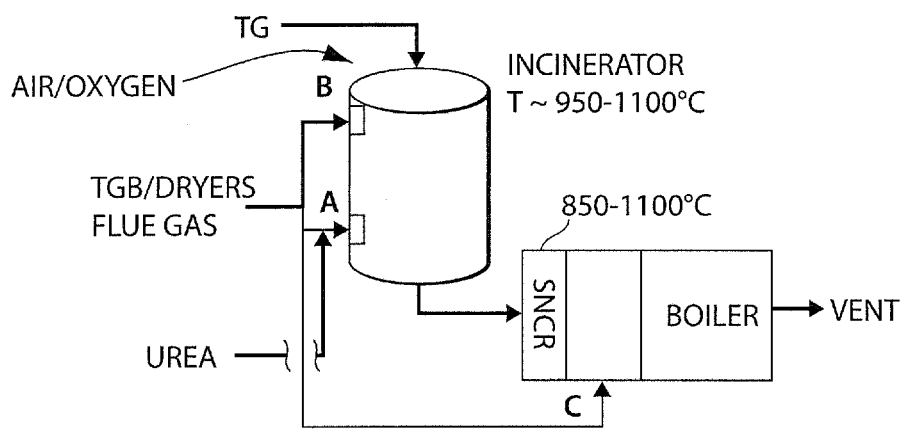
FIG. 6 is a process flow diagram showing an aftertreatment system for tail gas including an incinerator and SNCR system according to an example of the present invention.

Referring to FIGS. 3-6, an aftertreatment system for tail gas including an incinerator and SNCR system is illustrated in FIG. 3 for sake of comparison with several aftertreatment arrangements for tail gas including an incinerator and SNCR system according to the present invention as shown in FIGS. 4-6. These incinerator and SNCR systems can be used as an "ISS" such as shown in the carbon black production apparatus of FIG. 2, but are not limited thereto and can have wide application to treatment of tail or exhaust gases of combustion systems.

In the arrangements shown in FIGS. 3-6, tail gas (TG) is introduced near the top of an incinerator and flows generally downward in a top-to-bottom direction through the unit before being discharged near the bottom of the unit. In FIGS. 3-6, an air inlet(s) and a top burner of the incinerator, and other incinerator and SNCR fittings and components that can be used are not shown to simplify the drawings for discussion.

In FIG. 3, a basic design of a low-$NO_x$ boiler is illustrated where tail gas (TG) is incinerated, for instance, at approximately 1200° C. while an SNCR is operated, for instance, at 850° C. to 1100° C. in this arrangement and a flue gas recycle (FGR*) is used mostly to control SNCR temperature at inlet "A" located near the bottom of the incinerator (e.g., in the bottom 33% of the vessel height). An oxygen-containing source can be introduced into the incinerator to ensure almost or complete combustion of the tail gas. A $NO_x$ reducing agent, urea, is introduced at the SNCR. The indicated "superheater" is a radiant shield placed before the SNCR to further reduce temperature in the process unit. After heat transfer (removal) in a boiler which can be used with the SNCR system, the flue gas leaves the boiler to provide the vent and FGR* streams of the flue gas. In this comparison arrangement, less than 25% of total flue gas (by volume) is recycled, shown as recirculation stream FGR*, to position "B" near at the top of the incinerator (e.g., in the top 33% of the vessel height), so any moderation of combustor temperature will be limited. Compared to the arrangement of FIG. 3, enhanced $NO_x$ reduction has been found to be attainable using the different arrangements, such as those shown, for example, in FIGS. 4-6.

In FIG. 4, a low-$NO_x$ boiler arrangement is shown in which FGR is used to substantially reduce incinerator temperature. This is done by recirculating greater than 25% (by volume) (preferably greater than 40%, or more preferably greater than 50%) of the effluent discharged from the SNCR back to the incinerator as recirculated gas stream FGR. Also, when the tail gas (TG) contains less than or equal to about 4% water, e.g., a "dry tail gas" condition, the flue gas recirculation typically is increased relative to these ranges, all other factors equal, such as by recirculating greater than 30% (by volume) (or greater than 40%, or preferably greater than 50%, or more preferably greater than 60%) of the effluent discharged from the SNCR back to the incinerator. In the arrangement shown in FIG. 4, more than 25% (by volume) of total flue gas is recycled to position "B" near at the top of the incinerator (e.g., in the top 33% of the vessel height), so moderation of combustor temperature can be significant. These recycle percentages can be on a gravimetric rate basis (e.g., tons/hour, etc.). An oxygen-containing source can be introduced into the incinerator to ensure almost or complete combustion of the tail gas. Introduction of the FGR as diluent in the incinerator moderates the incinerator temperature to approximately 950° C. to 1100° C. in this illustration, while the SNCR is operated at approximately 850° C. to 1100° C. Urea or other reducing agent can be still introduced at the SNCR in this example. No flue gas injection is needed at inlet "A" on the incinerator because incinerator is already at the proper temperature for SNCR. Both SNCR use and combustor temperature reduction reduce $NO_x$ emissions, and use of flue gas recycle to control temperatures is found to be a highly advantageous way to do this to maintain boiler efficiency.

In FIG. 5, flue gas is recycled to position "B" near at the top of the incinerator (e.g., in the top 33% of the vessel height), and the $NO_x$ reducing agent, e.g., urea, is injected into port "A" alone or with small FGR (e.g., typically about 5% to about 10%, but if "B" flow is low can be up to 40%) (e.g., near the bottom of the incinerator, such as in the bottom 33% of the vessel height). An oxygen-containing source can be introduced into the incinerator to ensure almost or complete combustion of the tail gas. Introduction of the FGR as diluent in the incinerator also moderates the incinerator temperature to approximately 950° C. to 1100° C. in this illustration, while the SNCR is operated at approximately 850° C. to 1100° C. The recycle rate FGR from the SNCR that is introduced at position "B" of the incinerator can be similar to that indicated for the arrangement for FIG. 4, or can be smaller values. The reducing agent (urea) can be injected into the incinerator in this arrangement, such as at position "A", because the incinerator is already at a proper temperature for SNCR. For the same reason, the radiant shield (superheater) can be moved after SNCR. The SNCR volume can be reduced because SNCR begins in the incinerator.

In FIG. 6, this design is similar to that of FIG. 5 except that tail gas burner (TGB)/dryers flue (DF) gas is used to control temperature at the incinerator instead of flue gas recycle from the boiler and SNCR. An oxygen-containing source can be introduced into the incinerator to ensure almost or complete combustion of the tail gas. Introduction of the dryers flue gas as diluent in the incinerator moderates the incinerator temperature to approximately 950° C. to 1100° C. in this illustration, while the SNCR is operated at approximately 850° C. to 1100° C. This arrangement can use a third flue gas injection point. For example, injection point "B" can be used to reduce incinerator temperature as low as safely possible, and injection point "A" can be used to reduce the incinerator temperature to the SNCR temperature and with injection of urea, and injection point "C" can be used for injecting any excess flue gas (FG) remaining. The TGB/DF gas can have higher total $NO_x$ and/or NPCs than FGR (boiler) by favoring the indicated reactions (7) and (8) for $NO_x$ destruction. A possible recovery of an extra 15% of energy from a furnace carbon black production plant, for example, may be obtained using this scheme. The arrangement of FIG. 6 can be combined with that of FIG. 5, wherein a portion of SNCR effluent is recycled back to the incinerator in addition to dryer flue gas introduction. As indicated, the amount and types of diluent introduced at the incinerator can be selected and implemented to moderate the temperature to NO reducing levels, such as in the presence of NPCs.

Further, with respect to the arrangement of FIG. 6, flue gas from the dryers is sent into the combustor, SNCR, or both, of the energy center instead of, or in addition to, flue gas recycle. Use of the flue gas from the dryers to augment or replace the flue gas recycle from the boiler permits a number of additional benefits to be realized. Increased energy recovery efficiency is made possible as dryer effluent gas can be greater than 500° C., in furnace carbon black production. Previously this waste heat has not been captured, or at least not in the manner of the present invention. If the dryer flue gas stream is sent to the incinerator, much of the sensible heat can be recovered because the boiler effluent can be approximately 230° C. or other lower temperatures. The use of dryer effluent in the combustor can enable $NO_x$ control in the TGB/dryer with no need to re-design the TGB/dryer. Any $NO_x$ created in the tail gas burners for dryers can be destroyed in the SNCR. The tail gas burners/dryers may have no $NO_x$ abatement. Installing SNCR in the tail gas boiler can greatly increase the complexity and cost. Sending the dryer effluent to the incinerator can reduce or avoid the cost. $NO_x$ generated in tail gas burners can remove HCN and $NH_3$ in the main tail gas stream to the boiler. If the dryer effluent is combined with the tail gas before entering the combustor or incinerator, $NO_x$, HCN and $NH_3$ can be present together. This would enable indicated reactions (7) and (8) to occur in the combustor. Effectively, this acts as in situ SCNR to reduce $NO_x$ without reducing agent injection.

As additional details on the incinerator and SNCR system of the comparison arrangement shown in FIG. 3, a combustor for combusting combustible materials can be provided as an incinerator, which can comprise a vertically-oriented combustion chamber comprising a top, a bottom, a substantially cylindrical side wall connecting the top and bottom, and at least one tail gas inlet for tail gas (TG) introduction and at least one exhaust gas outlet can be provided in the side wall. A top burner can be located inside at the top of the chamber, which is adapted to receive fuel from an external fuel source. One or more air inlets can be provided to the combustion chamber. The exhaust gas outlet of the combustor can be fed into an SNCR. The gas treated in the SNCR region can then flow through a boiler. Boiler feed water can be fed to a steam drum and condensate can be sent to the boiler to vaporize to produce steam flowing back to the steam drum. The flue gas can leave the boiler to provide the vent and FGR* streams. The SNCR system (e.g., SNCR and boiler) produces a gas effluent that can be vented, or recycled (FGR* or FGR) to the combustor.

In an arrangement, a steam boiler can be equipped with an SNCR device for reduction of $NO_x$ in the final flue gas. Reducing agent can be added at the SNCR using spray nozzles. The SNCR can have a plurality of spray nozzles (e.g., one to six or more), which can be arranged vertically three to a side (top and bottom) spraying into a space downstream of the radiant shield, which separates the combustion chamber from the steam generation pipes. The SNCR can operate by spraying a urea solution and/or other $NO_x$ reducing agent into the flue gas stream coming from the combustor. The optimal operating temperature of the SNCR can range from approximately 850° C. to 1000° C. or 950° C. to 1000° C. The placement of the SNCR nozzles behind the radiant shield follows from a design assumption that the combustor will operate at a temperature above the range appropriate for the SNCR reaction.

A process line identified as FGR (a flue gas recirculation line) can be used. The FGR line can branch at the combustor, and recycled flue gas can be fed into the combustor near the top (e.g., within the top 33% of the vessel height), or near the bottom (e.g., within the bottom 33% of the vessel height), or both. Flue gas recycle can increase the efficiency of the boiler, and reduce the temperature in the combustion chamber. If the temperature in the combustion chamber is reduced via a flue gas recycle (top entry port) to the point of being in the range such as 850° C. to 1000° C., it may no longer be desirable to situate the SNCR behind the radiant shield, which can drop the temperature approximately an additional 100° C. In this illustration, as indicated, the urea solution and/or other reducing agent can be injected into the flue gas recycle line that feeds into the bottom of the combustor. The line can have a venturi orifice flow meter near the entrance to the combustor. If the urea solution and/or other reducing agent is injected at the narrow point of the venturi of the flow meter, the high velocity of the recycled flue gas can disperse the solution. The bottom portion of the combustor now can act as additional residence time for the SNCR reaction to occur. This design has the added advantage of simplifying the addition of urea solution and/or other $NO_x$ reducing agent, as a single ring spray can be used instead of multiple separate nozzles, whose flows must be modulated individually. The FGR can be done by recirculating greater than 25% (preferably greater than 40%, or more preferably greater than 50%) of the effluent discharged from the SNCR system back to the incinerator as recirculated gas stream FGR.

The tail gas after-treatment methods and systems of the present invention can have one or more of the following features.

A reduction in $NO_x$ in the flue gas, for example, of at least about 10%, or at least about 15%, or at least about 20%, or at least about 30%, or at least about 40%, or at least about 50%, or from about 10% to about 50%, on a gravimetric rate basis, can be obtained relative to $NO_x$ in the flue gas obtained with the combustor operated at a temperature of about 1200° C.

The diluent introduced into the incinerator or combustor can control the combustor temperature to a temperature, for example, of from about 950° C. to about 1100° C., or from about 975° C. to about 1100° C., or from about 990° C. to about 1075° C., or from about 1000° C. to about 1050° C., or from about 1010° C. to about 1030° C., or other temperature ranges. The tail gas can have a residence time in the combustor, for example, of from about 0.2 second to about 5 seconds or more, or from about 0.5 second to about 4 seconds, or from about 1 second to about 3 seconds, or from about 1.5 seconds to about 2.5 seconds, or other times. The diluent introduced at the incinerator can comprise, for example, 25% or more, or 30% or more, or 40% or more, or 50% or more, or 60% or more, on a gravimetric rate basis, of total flue gas discharged from the at least one selective non-catalytic reduction unit. The diluent can comprise at least a portion of the flue gas of the at least one selective non-catalytic reduction unit, and at least a portion of the $NO_x$ reducing agent is introduced in the combustor. The diluent can comprise at least in part flue gas from a carbon black dryer. Where flue gas from a carbon black dryer is used as diluent at the incinerator, the dryer flue gas can have a temperature, for example, greater than 200° C., or from about 225° C. to about 650° C., or from about 400° C. to about 600° C., or from about 450° C. to about 550° C. The dryer flue gas can contain $NO_x$, such $NO_x$ at no less than 5 mg/$Nm^3$, or greater than 50 mg/$Nm^3$, or greater than 100 mg/$Nm^3$. The $NO_x$ content of the dryer flue gas also can be reduced by the indicated aftertreatment arrangements of the present invention.

Effluent from the combustor can be conducted to at least one selective non-catalytic reduction unit having a temperature, for example, of from about 850° C. to about 1100° C., or from about 900° C. to about 1050° C., or from about 900° C. to about 1000° C., or from about 925° C. to about 1000° C., or from about 950° C. to about 1000° C., or other temperature values. The SNCR volume to boiler volume can be, for example, in a ratio of from about 0.1 to about 10, or from about 0.2 to about 5, or from about 0.4 to about 3, or from about 0.5 to about 2.

The present invention also relates to a method of reducing $NO_x$ emissions in the incineration of tail gas comprising controlling air-to-fuel ratio in the combustor into which tail gas is introduced, while controlling flame temperature of the combustor through diluent injections. The oxygen concentration of effluent of the combustor can be reduced without increasing combustor temperature. The effluent can be conducted from the combustor to at least one selective non-catalytic reduction unit, wherein $O_2$ concentration of flue gas discharged from the selective non-catalytic reduction unit is less than about 8 vol %, or less than about 5 vol %, or less than about 3 vol %, in this configuration with air-to-fuel ratio controlled at the combustor.

The effluent can be conducted from the combustor to the at least one selective non-catalytic reduction unit free of any intervening radiant shield reducing effluent temperature more than about 10° C. before introduction of the effluent into the at least one selective non-catalytic reduction unit.

At least one $NO_x$ reducing agent can be introduced to at least one selective non-catalytic reduction unit located downstream of the combustor, to the combustor, or both, wherein the $NO_x$ reducing agent or decomposition products thereof or both react with $NO_x$ to produce nitrogen included with flue gas discharged from the at least one selective non-catalytic reduction unit. The $NO_x$ reducing agent can be urea $((NH_2)_2CO)$, ammonia $(NH_3)$, isocyanic acid (HNCO), or combinations thereof, and/or other reducing agents for $NO_x$. The $NO_x$ reducing agent can comprise, for example, an aqueous urea solution, an aqueous ammonia solution, or combinations thereof. The reducing agents can comprise, for example, a dilute aqueous solution containing urea, ammonia, or both, in water in the range of from about 1% to about 25% by weight, based on active agent, or other concentrations. The introduction of reducing agent(s) may be done at a single introduction point or as staged using one or more injection nozzles positioned along the flue gas recycle flowpath (FGR). $NH_3$ can be generated incrementally, for example, by the decomposition or vaporization of reducing agents which are injected in the FGR or directly at the combustor, as applicable, as solids, liquid melts, emulsions, slurries, or solutions. Some ammonium salts, such as ammonium carbonate $((NH_4)_2CO_3)$, and ammonium bicarbonate $((NH_4)HCO_3)$, can decompose essentially completely into gases, such as by releasing $NH_3$ and $CO_2$ when heated, and the carbonate also may generate water.

The tail gas compositions that can be treated by the methods and apparatus of the present invention to reduce $NO_x$ levels therein are not particularly limited. The tail gas introduced to the incinerator can have a net heating value, for example, of from about 40 to about 120 BTU per standard cubic feet (scf), or from about 45 to about 110 BTU per standard cubic feet (scf), or from about 50 to about 80 BTU per standard cubic feet (scf). A fuel or source of fuel, other than the tail gas or other tail gas, can be introduced into the combustor (incinerator).

Table 1 in the examples section herein indicates some exemplary non-limiting tail gas compositions that can be treated to reduce $NO_x$ using the present invention. Without wishing to be bound by any particular theory, it also is believed that certain compositional characteristics of the tail gas can assist use of low temperature combustion through inerting by external agents (such as flue gas recirculation). First, many incinerator fuels (e.g., oil, coal, natural gas) have extremely high heating values and burn extremely rapidly. Combustion is completed, and peak adiabatic flame temperatures are achieved too quickly, and the mixing time for the diluent is often too great to avoid the high temperatures observed in these flames. Use of a fuel which contains high amounts of hydrogen, which is easily ignited, can remain stable even when combustion temperature is reduced. Conversely, oil and natural gas, and coal can be more difficult to ignite, requiring more thermal energy, and low temperature flame cannot sustain itself, so even if one could pre-dilute the fuel with the diluent to solve the first problem (above), the reduction in the adiabatic temperatures in the incinerator could lead to instabilities.

As indicated, the $NO_x$ emission control with tail gas incineration provided by the present invention can be used, for example, for tail gases of furnace carbon black reactors, with adaptations and modifications such as related herein. The present invention can be used, for example, to treat tail gases generated in carbon black reactors such those in a modular, also referred to as "staged," furnace carbon black reactor configuration. Staged furnace reactors that can receive tail gas treatment according to the present invention are shown, for example, in U.S. Pat. Nos. 3,922,335l; 4,383,973; 5,190,739; 5,877,250; 5,904,762; 6,153,684; 6,156,837; 6,403,695; and 6,485,693 B1, all of which are incorporated in their entireties by reference herein.

The process conditions and raw materials used in the carbon black reactors that generate tail gas which can be treated according to the present invention, are not particularly limited. FIG. 2 shows a portion of a type of furnace carbon black reactor 2 which may be used in a process of the present invention to produce carbon blacks. Useful diameters and lengths of the various zones in the reactor that may be used can be selected with reference to the above-indicated patents incorporated by reference. Among the fuels suitable for use in reacting with the oxidant (air) stream in combustion zone 18 to generate the hot combustion gases, are any of the readily combustible gas, vapor or liquid streams such as natural gas, hydrogen, carbon monoxide, methane, acetylene, alcohols, or kerosene, or other fuels. It is generally preferred, however, to utilize fuels having a high content of carbon-containing components and, in particular, hydrocarbons. The ratio of air to natural gas utilized to produce the carbon blacks may be from about 1:1 (stoichiometric ratio) to infinity. To facilitate the generation of hot combustion gases, the oxidant stream may be preheated. As indicated, the hot combustion gas stream flows downstream to the throated zone of the reactor where carbon black-yielding feedstock can be introduced, and/or at other feedstock introduction points in the reactor. The feedstock may be introduced, for example, either through a probe (axially or radially), radially inward through a plurality of openings positioned in the wall of the reactor, or a combination of the two. Suitable for use herein as the types of carbon black-yielding hydrocarbon feedstocks, which can be readily volatilizable under the conditions of the reaction, include those described in the above-indicated incorporated patents. The feedstock may be preheated before it is introduced into the reactor. Upon introduction, the feedstock combines with the heated gas stream for forming a reaction stream in which carbon black is formed in the reactor.

Additives, such as those conventionally used in carbon black production, can be introduced into the reactor. Additives which can modify the structure of carbon black, for example, such as Group I and/or II alkali/alkaline metal ions, may be used as additives. These additives can be added, for example, in an amount such that 200 ppm or more of the Group IA element or ion and/or Group IIA element (or ion thereof) is present in the carbon black product ultimately formed. The additive(s) can be added in any fashion including any conventional means. In other words, the substance can be added in the same manner that a carbon black yielding feedstock is introduced. The substance can be added as a gas, liquid, or solid, or any combination thereof. The substance can be added at one point or several points and can be added as a single stream or a plurality of streams.

The reaction stream within the reactor can have a temperature at quench, for example, of from about 600° C. to about 2000° C., or from about 800° C. to about 1800° C., or from about 1000° C. to about 1500° C., or other high temperatures reflecting an extreme exothermic reaction that is generated in the furnace reactor. The carbon black in the reaction stream can be quenched in one or more zones. For example, as indicated in FIG. 2, at quench location 15, quenching fluid is injected, which can be water, which can be used to completely or essentially completely stop pyrolysis of the carbon black-yielding feedstock, or only partially cool the feedstock without stopping pyrolysis followed by a secondary quench 21, which can be downstream of a heat exchanger 3, used to stop pyrolysis of the carbon black-yielding feedstock. After the mixture of hot combustion gases and carbon black-yielding feedstock is quenched, the cooled gases pass downstream into separating means, which can be conventional, whereby the carbon black is recovered and tail gas is conveyed to an ISS or the present invention.

The present invention includes the following aspects/embodiments/features in any order and/or in any combination:

1. The present invention relates to a method of reducing $NO_x$ emissions in the incineration of tail gas comprising:
   introducing tail gas into a combustor having a combustor temperature, wherein the tail gas comprises $NO_x$, $NO_x$ precursors, or both, and x is a positive value; and
   introducing diluent into the combustor for controlling the combustor temperature to a temperature of from about 950° C. to about 1100° C.

2. The method of any preceding or following embodiment/feature/aspect, wherein said tail gas is from at least one carbon black furnace.

3. The method of any preceding or following embodiment/feature/aspect, wherein said tail gas has a residence time in said combustor of from about 0.2 sec to about 5 seconds.

4. The method of any preceding or following embodiment/feature/aspect, further comprising conducting effluent from the combustor to at least one selective non-catalytic reduction unit having a temperature of from about 850° C. to about 1100° C.

5. The method of any preceding or following embodiment/feature/aspect, further comprising introducing at least one $NO_x$ reducing agent to at least one selective non-catalytic reduction unit located downstream of said combustor, the combustor, or both, wherein the $NO_x$ reducing agent or decomposition products thereof or both react with $NO_x$ to produce nitrogen included with flue gas discharged from the at least one selective non-catalytic reduction unit.

6. The method of any preceding or following embodiment/feature/aspect, wherein the diluent comprises 25% or more on a gravimetric rate basis of total flue gas discharged from the at least one selective non-catalytic reduction unit, and at least a portion of the $NO_x$ reducing agent is introduced directly in the at least one selective non-catalytic reduction unit.

7. The method of any preceding or following embodiment/feature/aspect, wherein tail gas introduced to the combustor comprises less than or equal to about 4 wt % water and the diluent comprises 30% or more on a gravimetric rate basis of total flue gas discharged from the at least one selective non-catalytic reduction unit, and at least a portion of the $NO_x$ reducing agent is introduced directly in the at least one selective non-catalytic reduction unit.

8. The method of any preceding or following embodiment/feature/aspect, wherein the flue gas is recycled to the combustor from a same selective non-catalytic reduction unit to which the $NO_x$ reducing agent is directly introduced.

9. The method of any preceding or following embodiment/feature/aspect, wherein the diluent comprises at least a portion of the flue gas of the at least one selective non-catalytic reduction unit, and at least a portion of the $NO_x$ reducing agent is introduced in the combustor.

10. The method of any preceding or following embodiment/feature/aspect, wherein the diluent comprises flue gas from a combustion source, and, optionally, at least a portion of the $NO_x$ reducing agent is introduced in the combustor.

11. The method of any preceding or following embodiment/feature/aspect, wherein the diluent comprises flue gas from a carbon black dryer, and, optionally, at least a portion of the $NO_x$ reducing agent is introduced in the combustor.

12. The method of any preceding or following embodiment/feature/aspect, wherein the diluent comprises a flue gas from a carbon black dryer having a temperature of greater than 200° C.

13. The method of any preceding or following embodiment/feature/aspect, further comprising introducing a fuel, other than said tail gas or other tail gas, into said combustor.

14. The method of any preceding or following embodiment/feature/aspect, wherein the effluent is conducted from the combustor to at least one selective non-catalytic reduction unit free of any intervening radiant shield reducing effluent temperature more than about 10° C. before introduction of the effluent into the at least one selective non-catalytic reduction unit.

15. The method of any preceding or following embodiment/feature/aspect, wherein the $NO_x$ reducing agent is urea, ammonia, or both.

16. The method of any preceding or following embodiment/feature/aspect, wherein the $NO_x$ reducing agent comprises an aqueous urea solution.

17. The method of any preceding or following embodiment/feature/aspect, wherein at least a 10% reduction, on a gravimetric rate basis, in $NO_x$ in the flue gas is obtained relative to $NO_x$ in the flue gas obtained with the combustor operated at a temperature of about 1200° C.

18. The method of any preceding or following embodiment/feature/aspect, wherein the tail gas as introduced to the incinerator has a net heating value of from about 40 to about 120 BTU per standard cubic feet (scf).

19. The method of any preceding or following embodiment/feature/aspect, wherein thermal $NO_x$ is a minority reaction occurring in the incinerating of the tail gas.

20. The method of any preceding or following embodiment/feature/aspect, wherein the incinerating of the tail gas occurs in the substantial absence of thermal $NO_x$.

21. The method of any preceding or following embodiment/feature/aspect, wherein the incinerating of the tail gas occurs without formation of thermal $NO_x$.

22. The method of any preceding or following embodiment/feature/aspect, wherein SNCR volume to boiler volume is in a ratio of from about 0.1 to about 10.

23. A method of reducing $NO_x$ emissions in combustion tail gas, comprising:
   introducing tail gas from combustion of at least one hydrocarbon into an incinerator having an incinerator temperature, wherein the tail gas comprises $NO_x$ and $NO_x$ precursors, and x is a positive value;
   introducing diluent into the incinerator for controlling the incinerator temperature to a temperature of from about 950° C. to about 1100° C.;

conducting effluent from the incinerator to at least one selective non-catalytic reduction unit having a temperature of from about 850° C. to about 1100° C.;

introducing at least one $NO_x$ reducing agent to the at least one selective non-catalytic reduction unit, the incinerator, or both, wherein the $NO_x$ reducing agent or decomposition products thereof or both react with $NO_x$ to produce nitrogen included with flue gas discharged from the at least one selective non-catalytic reduction unit.

24. A method of reducing $NO_x$ emissions in the incineration of tail gas comprising controlling air-to-fuel ratio in a combustor into which tail gas is introduced, while controlling flame temperature of the combustor through diluent injections, wherein the tail gas comprises $NO_x$, $NO_x$ precursors, or both, and x is a positive value, and the oxygen concentration of effluent of the combustor is reduced without increasing combustor temperature.

25. The method of any preceding or following embodiment/feature/aspect, further comprising conducting effluent from the combustor to at least one selective non-catalytic reduction unit, wherein $O_2$ concentration of flue gas discharged from the selective non-catalytic reduction unit is less than about 8 vol %.

26. A boiler unit for incineration of tail gas, comprising:
  (i) combustor operable for receiving:
    (a) tail gas comprising $NO_x$, $NO_x$ precursors, or both, and
    (b) diluent of type(s) and amount(s) for controlling combustor temperature to from about 950° C. to about 1100° C.; and
  (ii) at least one selective non-catalytic reduction unit comprising at least one selective non-catalytic reduction device and a boiler, said reduction unit operable for receiving effluent discharged from the combustor and at least one $NO_x$ reducing agent or decomposition products thereof or both reactable with $NO_x$ to produce nitrogen included with flue gas discharged from the at least one selective non-catalytic reduction unit.

27. An apparatus for carbon black production comprising a carbon black furnace reactor for producing carbon black and tail gas, a filter for separating carbon black from the tail gas, and a boiler unit for incineration of the tail gas according to the preceding claim.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Figure 7:
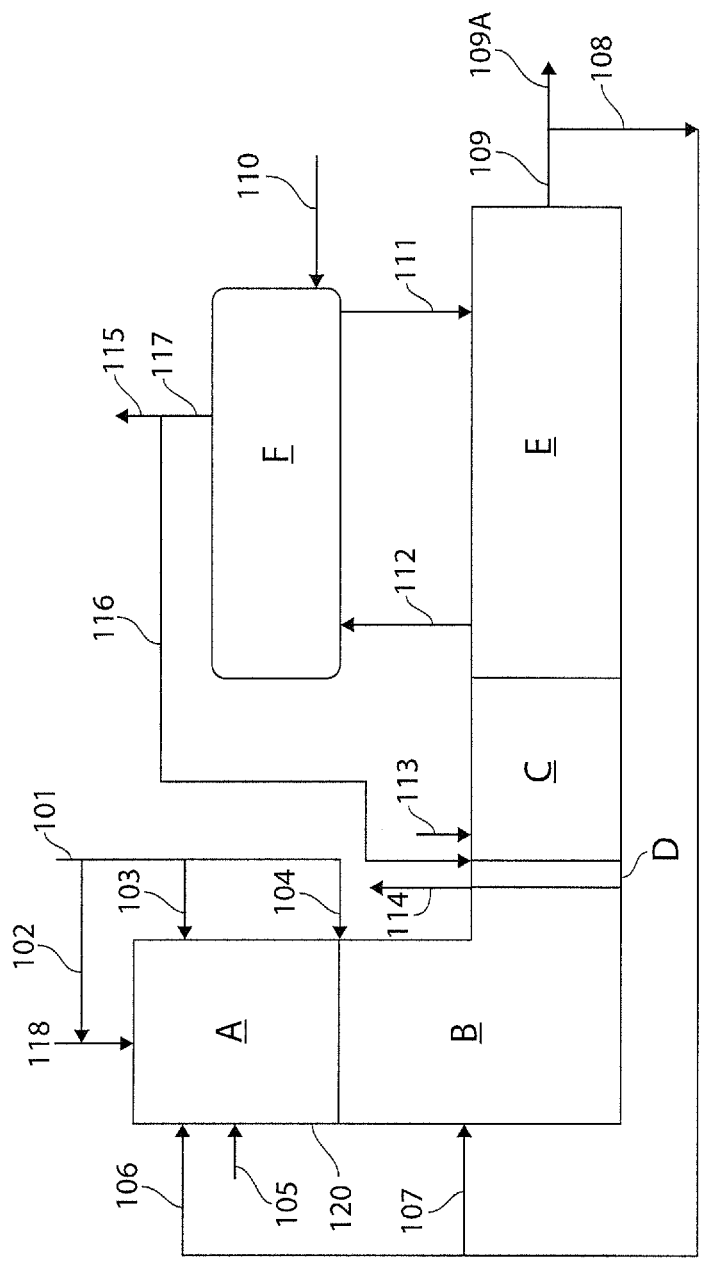
FIG. 7 is a process flow diagram showing an aftertreatment system for tail gas including an incinerator and SNCR system according to an example of the present invention. This aftertreatment system is used in the examples, but is only illustrative of the systems which may be used in the present invention.

The present invention was demonstrated on a commercial tailgas fueled steam boiler. The configuration of the boiler is illustrated in FIG. 7. The drawing is not to scale.

In FIG. 7, the tailgas combustor in composed of sections A and B. Streams and zones/vessels are highlighted with numbers and letters respectively. Throughout this discussion, parentheses are used when referencing streams (#) and zones/vessels (abc). The flame burns top down. Tailgas fuel feeds into the combustor (120) through inlet (105). Combustion air delivered in line (101) is split into three streams, where stream (102) is sent to the combustor from the top as pilot burner air supply. Streams (103) and (104) are injected into the combustor at two elevations. The air streams are injected through a perforated plate in the radial direction to the combustor to achieve uniform distribution. The staging of combustion air results in two combustion zones in the combustor with the air to fuel ratio in each of the combustion zones adjustable via the flow rate of streams (103) and (104).

Combusted tailgas is sent to boiler (E) through steam super heater (D). After heat transfer in boiler (E), the flue gas leaves the boiler as stream (109). Stream (109) can be split into stream (109A) and a portion of the flue gas (108) from the boiler outlet is recycled back to the combustor (120) through a blower (not shown). The recycled flue gas (108) is split into two streams (106) and (107), which are injected at different locations of the combustor. Stream (106) is used mainly to control the temperature in the combustor and stream (107) is used to fine tune the SNCR temperature (shown as zone (C)). Urea injection, used as a $NO_x$ reduction reagent, is supplied via (113).

Boiler feed water is fed to steam drum (F) and condensate (111) is sent to the boiler (E) to vaporize to produce steam (112). Final steam product (115) leaves the unit for utilization. A fraction of the steam coming out of the steam drum is sent to the steam super heater (D) to produce superheated steam. Meanwhile, super heater (D) acts as radiant shield to protect boiler tubes from being over heated. Because the trial was done during steam production, steam demand dictated the amount of tail gas processed, so flows varied throughout the run. The volumes of the key zones for reaction were as follows:

Upper combustion zone (A): 58.3 m³.
Lower combustion zone (B): 258.7 m³.
SNCR reaction zone (C): 101.4 m³.

The average flue gas flow in the incinerator (including recycle, (109A)+(108)) was calculated to be 96,081 Nm³/hr (based on mass balance and assuming complete combustion). Therefore the average normal space velocity (defined as Nm³/hr flue gas flow per m³ of volume) were as follows:

Upper combustion zone (A): 2280 hr⁻¹.
Lower combustion zone (B): 514 hr⁻¹.
SNCR reaction zone (C): 1311 hr⁻¹.

The tailgas for the average composition is given in Table 1. NPCs were measured throughout the trial, so this value is based on measurements. The remaining components are estimated based on thermodynamics and mass balance. Table 1 also contains non-limiting ranges of tail gas compositions that can be used for various production conditions and various raw materials used in methods of the present invention.

Table 2 summarizes the range of variables tested during the demonstration trial. Two studies were carried out concurrently. The first study investigated boiler performance only (with the SNCR off). The second study investigated the performance of the SNCR by simply turning on the SNCR during each of the first study conditions and measuring the efficacy of the SNCR system at destroying $NO_x$. Thus, for each condition, the study was able to measure how well operational control alone could reduce $NO_x$, and how well the SNCR could then reduce the NOx post-combustion. As SNCR consumes reagents, it is preferable to prevent $NO_x$ through boiler operations rather than have to remediate it using urea or ammonia in an SNCR.

Pilot air (102) was kept constant during the entire trial. Natural gas was shut off during the data set described here.

$NO_x$ emission from the boiler was continuously monitored with an on-line $NO_x$ analyzer installed on the stack. The $NO_x$ concentration was converted to dry base, in 3% $O_2$ following industrial standard.

Figure 8:
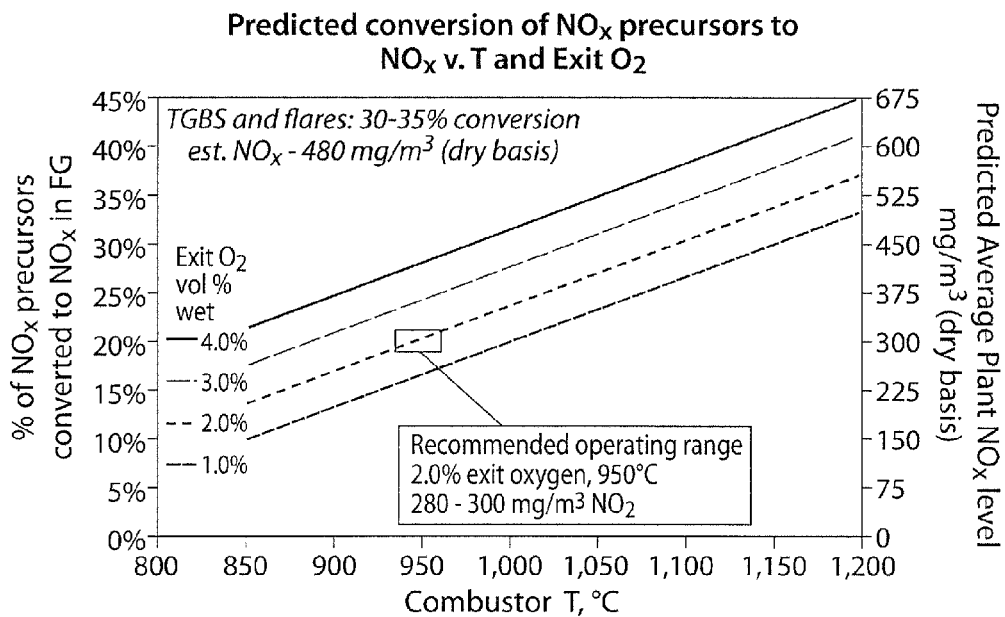
FIG. 8 is a plot showing a model prediction of $NO_x$ versus incinerator temperature (T) at maximum flows tested (125,000 $Nm^3$/hr total flue gas to stack) for an aftertreatment system used in the examples.
Figure 9:
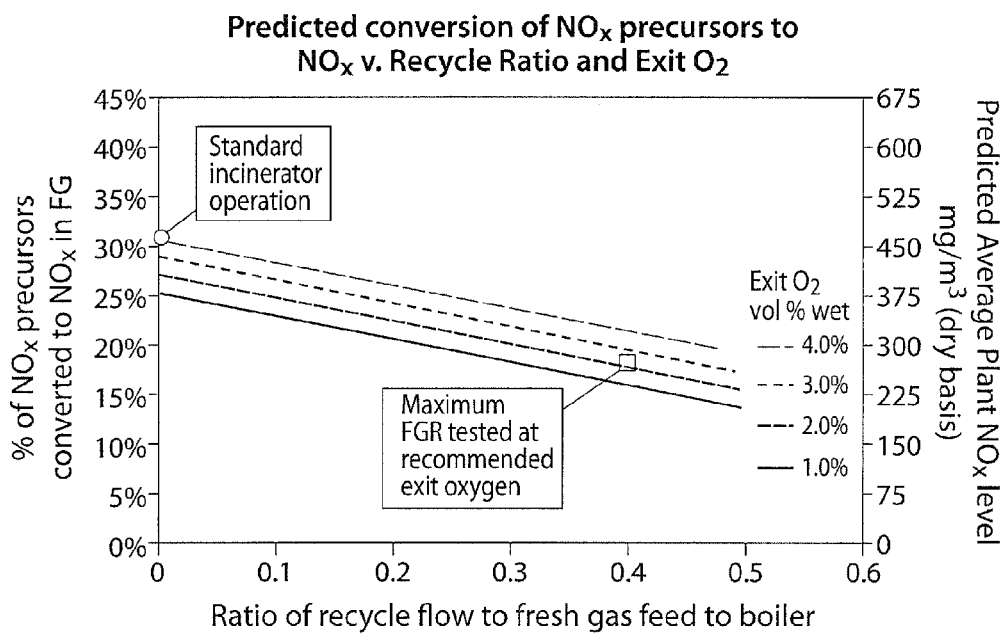
FIG. 9 is a plot showing a model prediction of $NO_x$ versus flue gas recycle (FGR) ratio at maximum flows tested (125,000 $Nm^3$/hr total flue gas to stack) for an aftertreatment system used in the examples.

For operation without SNCR, two empirical, linear correlations were developed based on the significant variables in the design of experiment (DOE) (see Table 2). Because FGR and incinerator temperature are closely related, one can develop a good linear correlation using one or the other of these variables, but not both. Table 3 shows the correlation based on incinerator temperature, exit oxygen, and vent flue gas flow. FIG. 8 shows a correlation between $NO_x$ emission and combustor temperature, with flue gas oxygen constant. FIG. 8 graphically depicts the correlation for a constant vent flue gas flow of 125,000 $Nm^3/hr$. The high-end range of the DOE is depicted because it illustrates the most challenging regime for $NO_x$ abatement. Table 4 shows an alternate correlation based on flue gas recirculation fraction exit oxygen, and vent flue gas flow. FIG. 9 shows a correlation between $NO_x$ emission and flue gas recycle ratio with flue gas oxygen constant. FIG. 9 graphically depicts the correlation for a constant vent flue gas flow of 125,000 $Nm^3/hr$.

FIG. 8 shows that when the combustor temperature decreases, the $NO_x$ emission level decreases. For example, at a flue gas oxygen concentration of 2 vol %, when the combustor temperature decreased from 1200° C. to around 950° C., the empirical correlation predicts a $NO_x$ emission that decreases from 550 $mg/Nm^3$ to 300 $mg/Nm^3$ with temperature. The plots are also labeled as "% of $NO_x$ precursors converted to $NO_x$ in flue gas" which is defined as the ratio of $NO_x$ molar flow in flue gas vs the molar flow of total NPCs in the tailgas feeding to the boiler. As NOx emission decreased, the "% of NOx precursors converted to $NO_x$ in flue gas" also decreased.

The effect of air to fuel ratio, i.e. flue gas oxygen concentration on the NOx emission is clearly demonstrated among the parallel lines in FIG. 8. At constant flame temperature, lower oxygen concentration results in lower $NO_x$ reduction.

Similar results can be seen in FIG. 9, which shows that as the flue gas recycle rate is increased, the $NO_x$ emission was decreased. Flue gas recycle ratio and air to fuel ratio have been demonstrated to be two effective ways to minimize $NO_x$ reduction.

The following non-limiting examples further illustrate the present invention. Results are summarized in Table 5.

Comparative Example 1A

This example illustrates a typical boiler operating condition. Tail gas entered the combustor of the boiler system at inlet (105), and the total flow of air to line (101) was controlled such that the exit oxygen content of the boiler was at 5.9%. The results are shown in Table 3. If all of the NPCs in the tail gas were converted to $NO_x$ in the boiler, 1455 $mg/Nm^3$ (dry basis) $NO_2$ in the flue gas would be measured. However, even in this unoptimized configuration, only 35.9% of the NPCs are converted to $NO_2$, and 522 $mgN/m^3$ $NO_2$, dry basis, was measured at the exit of the boiler. No urea was fed to the SNCR so no further $NO_2$ destruction occurred.

Comparative Example 1B

At the same boiler operating conditions as Comparative Example 1A, SNCR was turned on. Urea flow was increased until a minimal amount of $NO_2$ emissions were obtained. At this condition, 36.4% of the $NO_2$ fed to the SNCR was destroyed. However, heat losses across the radiant shield reduced the inlet temperature of the SNCR to 882° C. from 935° C. at the exit of the incinerator. This is known to be too low of a temperature for SNCR operation. SNCR operation is generally optimized between 900 and 1000° C. (e.g., Duo et al. *Can J. Chem. Eng.* 70, 1014 (1992).

As a result, urea conversion is poor. SNCRs generally convert around 50% (by weight) of the urea fed (e.g., Duo et al. *Can J. Chem. Eng.* 70, 1014 (1992); http://www.ftek.com/pdfs/TPP-522.pdf). However, in this example, it was estimated that only a 12% (by weight) urea conversion was towards $NO_x$ reduction reaction. Poor urea conversion is not desired; it increases RMC consumption and leads to ammonia emissions in the vent, which is also often regulated as an air pollutant.

Comparative Example 2A

In this example, $NO_2$ reduction was attempted primarily by reducing the exit oxygen concentration. No SNCR is used. Lower oxygen should reduce $NO_x$ emissions because the kinetics of the $NO_x$ formation reaction rely on oxygen concentration. However, in this example, only minimal flue gas recirculation is provided (<7 wt % of the total fresh gas feed). This is not adequate to maintain the lower temperature in Comparative Example 1A. The result is that the mixture of gases is closer to the stoichiometric air-to-burn ratio, so temperature is higher. Higher temperature favors NOx formation, so this offsets the benefits of reducing oxygen. There is some improvement in NOx (44.6 wt % less yield of NOx from NPCs versus Comparative Example 1A).

Comparative Example 2B

At the same boiler operating conditions as Comparative Example 2A, SNCR was turned on. Urea flow was increased until a minimal amount of $NO_2$ emissions were obtained. At this condition, 60 wt % of the $NO_2$ fed to the SNCR was destroyed. However, heat losses across the radiant shield reduced the inlet temperature of the SNCR to 850° C. from 1008° C. at the exit of the incinerator. As in example 1B, losses across the radiant shield caused the SNCR to operate below acceptable temperatures. Conversion of $NO_2$ was better only because the flow rates in this example were lower than Comparative Example 1B.

Example 3A

As in Comparative Example 2A, $NO_2$ reduction was attempted first by reducing the exit oxygen concentration, but unlike example 2A, flue gas recycle is used in high amounts (39 wt % of fresh gas feed) to reduce the incinerator temperature to 905° C. No SNCR is used. Reducing exit oxygen while keeping the incinerator at lower temperatures showed remarkable reduction in $NO_x$ emissions. $NO_x$ emissions were reduced by 61.2% versus Comparative example 1A (as measured by % NPCs converted to $NO_x$), and an additional 16.6 percentage point decrease in NPC yield to $NO_x$ from example 2A (where only lower oxygen was used). This example shows that high flue gas recirculation rates can be used to substantially reduce incinerator temperature and consequently, $NO_x$ emissions, especially when combined with reduced exit oxygen.

The reduction of temperature in the incinerator, and consequent $NO_x$ emissions could in principle be accomplished with any inert diluting agent, such as water, steam, nitrogen, carbon dioxide, or another flue gas source. However, flue gas recirculation has the advantage that it does not reduce energy recovery efficiency.

Example 3B

At the same boiler operating conditions as Example 3A, SNCR was turned on. Urea flow was increased until a minimal amount of $NO_2$ emissions were obtained. At this condition, only 19% of the $NO_2$ fed to the SNCR was destroyed, and only 2% of the urea fed was consumed. The low temperature combustion and heat losses across the radiant heat shield gave an extremely low SNCR operation temperature of 817° C., well below the acceptable temperature for SNCR operation. This example illustrates the paradox of low temperature combustion: As combustion temperature is lowered, inherent $NO_x$ in the incinerator is reduced, but the lower temperature makes traditionally designed SNCR reduction systems ineffective.

Example 4A

Prophetic

Example 4A illustrates a beneficial use of an external diluent instead of using internal flue gas recirculation to control temperature in the incinerator. In this example, the temperature, and exit oxygen rate are kept the same as in Example 3A, but the temperature is controlled by flue gas from an external combustion source. In this example, a carbon black dryer effluent is used with a similar composition to flue gas from Comparative Example 1A, containing 522 mg/m3 NOx (dry basis). This gas enters the boiler at 500° C. Performance is improved over Example 3A in two ways:

First, more $NO_x$ is abated, both on as a % of NPCs fed and an absolute mass basis. The absolute reduction of $NO_x$ is a result of the simple fact that the dryer is run similar to the unoptimized Example 1A and it has higher $NO_x$. Simply by adding it to the gas stream and reburning it with good temperature control, $NO_x$ is reduced. Simply put, 40% more gas is being processed with lower yields to $NO_x$. Additionally, the $NO_x$ in this flue gas will actually react with the NPCs coming in the tail gas, and run an in-situ SNCR at the incinerator inlet. This results in the yield of NPCs to $NO_x$ reducing from 13.9% in Example 3A to 11.8% in Example 4A.

Second, because the flue gas is at 500° C., diverting this gas to the boiler allows the boiler to recover this heat that would normally be wasted. Steam production would rise from 34.6 metric tons/hr in Example 3A to 39.8 metric tons/hr in Example 4A.

Example 4B

Prophetic

Example 4B resolves the paradox described in Example 3B. Operation is identical to Example 3B with one major change. Instead of injecting the urea solution at stream (113), the urea solution is co-injected with a small amount of FGR (or other gas) for atomization at stream (107). In normal incinerator operation (without FGR or other diluent add at stream (106), this would not be effective because the temperature in zone (B) would be too high for SNCR operation. However, in this example, FGR at stream (106) lowers the temperature in zone (B) to 907° C., on the low temperature side, but within the acceptable operation window for SNCR. Moreover, the low temperature is compensated by the much larger volume of zone (B) than the SNCR cavity. Zone (B) is roughly 2.5× zone (C) in volume, and consequently, residence time is also 2.5× of zone (C). As a result, more typical efficiencies for urea conversion (50%) and NOx conversion (60%) would be observed. This example uses boiler optimization and SNCR in the best configuration, resulting in the lowest NOx of all examples, 84.9% lower than the base Example 1A.

TABLE 1

Average tail gas composition for trial and typical tail gas compositions from carbon black processing

| | Average tail gas composition for DOE | Carbon black tail gas ranges |
|---|---|---|
| Major components, vol % (wet basis) | | |
| H2 | 12% | 5%-30% |
| CO | 12% | 5%-30% |
| CO2 | 0% | 1%-5% |
| H2O | 42% | 2%-50% |
| Hydrocarbons | <2% | <2% |
| N2 | balance | balance |
| Trace components, ppmv (dry basis) | | |
| NPCs (HCN + NH3 + NOx) | 1758 | 100-10000 |
| Sulfur containing species (e.g. H2S, CS2, COS, SO2) | 280 | 100-14000 |

TABLE 2

Design of experiment condition ranges

| | Min | Max | Significant correlation with boiler NOx formation? (F-test >95% confidence) |
|---|---|---|---|
| Variables studied in boiler DOE (no SNCR) Control variable (all bracketed points refer to FIG. 9) | | | |
| Exit oxygen vol % | 2.50% | 6% | Yes |
| Amount of pilot air, Nm³/hr (2) | 11,700 | 11,700 | Fixed variable |
| Distribution of additional air | All to 1° air (3) | All to 2° air (4) | No |
| Flue gas recirculated (FGR::total fresh gas feed to boiler)* | 0 | 0.39 | Yes |
| Incinerator exit temperature (B) | 854 | 1044 | Yes |
| Total flue gas to vent, Nm³/hr (9) | 59,170 | 124,001 | Yes |
| SNCR studies Control variable/condition | | | |
| SNCR inlet temperature [entrance to C] | 808 | 901 | |
| SNCR | off | on | |
| Urea injection rate kg per kg NO2 fed to SNCR | 0 | 6.06 | |

*Fresh gas feed is tail gas (5) + total air feed (1)

TABLE 3

Correlation based on incinerator temperature, exit oxygen, and vent flue gas flow. The degree of confidence is given by 100% - the value in the final column
Equation for correlation:
% NPCs converted to NO2 = b + m1 * FGvent + m2 * exit O2 + m3 * Tincinerator

| Correlation coefficient (or intercept) | Coefficient | Std Error | t Ratio | Prob > \|t\| |
|---|---|---|---|---|
| Intercept = b | −0.6325468 | 0.153402 | −4.123458 | 0.030% |
| Total vent flue gas at [9] = m1 | 9.52E−07 | 3.33E−07 | 2.862067 | 0.788% |

TABLE 3-continued

Correlation based on incinerator temperature, exit oxygen, and vent flue gas flow. The degree of confidence is given by 100% - the value in the final column
Equation for correlation:
% NPCs converted to NO2 = b + m1 * FGvent + m2 * exit O2 + m3 * Tincinerator

| Correlation coefficient (or intercept) | Coefficient | Std Error | t Ratio | Prob > \|t\| |
|---|---|---|---|---|
| Exit oxygen vol % = m2 | 3.84786618 | 0.447951 | 8.589932 | 0.000% |
| Incinerator temperature, ° C. = m3 | 6.75E−04 | 1.49E−04 | 4.530917 | 0.010% |

TABLE 4

Correlation based on flue gas recycle, exit oxygen, and vent flue gas flow. The degree of confidence is given by 100% - the value in the final column.
Equation for correlation:
% NPCs converted to NO2 = b + m1 * FGR/Gas flow to boiler + m2 * FGvent + m3 * exit O2

| Term | Estimate | Std Error | t Ratio | Prob > \|t\| |
|---|---|---|---|---|
| Intercept | 0.05541533 | 0.029655 | 1.8686665 | 8.13E−02 |
| FGR flow [8]/ Gas flow to boiler [1] + [5] = m1 | −2.29E−01 | 4.46E−02 | −5.1420078 | 1.20E−04 |
| Total vent flue gas at [9] = m2 | 1.42E−06 | 3.49E−07 | 4.08252652 | 9.80E−04 |
| Exit oxygen vol % = m3 | 1.85E+00 | 4.12E−01 | 4.49855511 | 4.25E−04 |

FIG. 10 shows Table 5, which is a summary of results for these examples. In Comparative Example 4A, FGR flow ratio to total fresh gas feed is calculated as follows: the FGR flow refers to flue gas from a carbon black dryer casing, and the fresh gas feed includes only tail gas and air. There is no internal flue gas recirculation in this example, but the carbon black dryer flue gas is treated as FGR and no "fresh" gas feed.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of reducing NOx emissions in the incineration of tail gas comprising:
   introducing tail gas into a combustor having a combustor temperature for incinerating the tail gas, wherein the tail gas comprises $NO_x$, $NO_x$ precursors, or both, and x is a positive value,
   wherein the combustor comprises a vessel having a top, bottom, at least one tail gas inlet near the top of the vessel, at least one diluent inlet, an exhaust gas outlet near the bottom of the vessel, wherein gas flows generally in a top-to-bottom direction through the vessel; and
   introducing diluent into the combustor for controlling the combustor temperature to a temperature of from about 950° C. to about 1100° C., wherein the diluent is introduced in a top 33% of vessel height of the combustor, and wherein the diluent comprises at least one of (i) 25% or more on a gravimetric rate basis of total flue gas discharged from at least one process unit located downstream of said combustor, or (ii) flue gas from a tail gas burner or carbon black dryer.

2. The method of claim 1, wherein said tail gas is from at least one carbon black furnace.

3. The method of claim 1, wherein said tail gas has a residence time in said combustor of from about 0.2 sec to about 5 seconds.

4. The method of claim 1, further comprising conducting effluent from the combustor to at least one selective non-catalytic reduction unit having a temperature of from about 850° C. to about 1100° C.

5. The method of claim 4, wherein the at least one selective non-catalytic reduction unit is provided with a selective non-catalytic reactor (SNCR) volume to boiler volume that is in a ratio of from about 0.1 to about 10.

6. The method of claim 1, further comprising i) introducing at least one NOx reducing agent to at least one selective non-catalytic reduction unit located downstream of said combustor, or ii) introducing the at least one NOx reducing agent to the combustor, or iii) both i) and ii), wherein for i) and iii) the NOx reducing agent or decomposition products thereof or both react with $NO_x$ to produce nitrogen included with flue gas discharged from the at least one selective non-catalytic reduction unit.

7. The method of claim 6, wherein the diluent comprises 25% or more on a gravimetric rate basis of total flue gas discharged from the at least one selective non-catalytic reduction unit, and at least a portion of the $NO_x$ reducing agent is introduced directly in the at least one selective non-catalytic reduction unit.

8. The method of claim 6, wherein tail gas introduced to the combustor comprises less than or equal to about 4 wt % water and the diluent comprises 30% or more on a gravimetric rate basis of total flue gas discharged from the at least one selective non-catalytic reduction unit, and at least a portion of the NOx reducing agent is introduced directly in the at least one selective non-catalytic reduction unit.

9. The method of claim 8, wherein the flue gas is recycled to the combustor from a same selective non-catalytic reduction unit to which the $NO_x$ reducing agent is directly introduced.

10. The method of claim 6, wherein the diluent comprises at least a portion of the flue gas of the at least one selective non-catalytic reduction unit, and at least a portion of the NOx reducing agent is introduced in the combustor.

11. The method of claim 6, wherein the diluent comprises flue gas from a tail gas burner or carbon black dryer, and, optionally, at least a portion of the $NO_x$ reducing agent is introduced in the combustor.

12. The method of claim 6, wherein the diluent comprises flue gas from a carbon black dryer, and, optionally, at least a portion of the $NO_x$ reducing agent is introduced in the combustor.

13. The method of claim 6, wherein the $NO_x$ reducing agent is urea, ammonia, or both.

14. The method of claim 6, wherein the $NO_x$ reducing agent comprises an aqueous urea solution.

15. The method of claim 1, wherein the diluent comprises a flue gas from a carbon black dryer having a temperature of greater than 200° C.

16. The method of claim 1, further comprising introducing a combustion fuel other than tail gas into said combustor.

17. The method of claim 1, wherein the effluent is conducted from the combustor to at least one selective non-catalytic reduction unit free of any intervening radiant shield reducing effluent temperature more than about 10° C. before introduction of the effluent into the at least one selective non-catalytic reduction unit.

18. The method of claim 1, wherein the introducing of the diluent provides at least a 10% reduction, on a gravimetric rate basis, in $NO_x$ in the flue gas relative to $NO_x$ in the flue gas obtained with the combustor operated at a temperature of about 1200° C.

19. The method of claim 1, wherein the tail gas as introduced into the combustor has a net heating value of from about 40 to about 120 BTU per standard cubic feet (scf).

20. The method of claim 1, wherein the incinerating of the tail gas introduced into the combustor occurs with thermal NOx formation being a minority reaction occurring with the incinerating of the tail gas.

21. The method of claim 1, wherein the incinerating of the tail gas introduced into the combustor occurs in the substantial absence of thermal $NO_x$.

22. The method of claim 1, wherein the incinerating of the tail gas introduced into the combustor occurs without formation of thermal $NO_x$.

23. The method of claim 1, comprising controlling air-to-fuel ratio in the combustor into which tail gas is introduced, while controlling flame temperature of the combustor through diluent injections, wherein the tail gas comprises $NO_x$, $NO_x$ precursors, or both, and x is a positive value, and the oxygen concentration of effluent of the combustor is reduced without increasing combustor temperature as compared to controlling the flame temperature of the combustor without the diluent injections.

24. The method of claim 23, further comprising conducting effluent from the combustor to at least one selective non-catalytic reduction unit, wherein $O_2$ concentration of flue gas discharged from the selective non-catalytic reduction unit is less than about 8 vol %.

25. The method of claim 1, wherein the vessel comprises a vertically-oriented combustion chamber comprising a side wall connecting the top and bottom, and a top burner located inside at the top of the chamber, which is adapted to receive fuel from an external fuel source.

26. A method of reducing NOx emissions in combustion tail gas, comprising:
    introducing tail gas from combustion of at least one hydrocarbon into an incinerator having an incinerator temperature, wherein the tail gas comprises NOx and NOx precursors, and x is a positive value, wherein the incinerator comprises a vessel having a top, bottom, at least one tail gas inlet near the top of the vessel, at least one diluent inlet, an exhaust gas outlet near the bottom of the vessel, wherein gas flows generally in a top-to-bottom direction through the vessel;
    introducing diluent into the incinerator for controlling the incinerator temperature to a temperature of from about 950° C. to about 1100° C., wherein the diluent is introduced in a top 33% of vessel height of the incinerator, and wherein the diluent comprises at least one of (i) 25% or more on a gravimetric rate basis of total flue gas discharged from at least one process unit located downstream of said incinerator, or (ii) flue gas from a tail gas burner or carbon black dryer;
    conducting effluent from the incinerator to at least one selective non-catalytic reduction unit having a temperature of from about 850° C. to about 1100° C.;
    introducing at least one $NO_x$ reducing agent to the at least one selective non-catalytic reduction unit, the incinerator, or both, wherein the $NO_x$ reducing agent or decomposition products thereof or both react with $NO_x$ to produce nitrogen included with flue gas discharged from the at least one selective non-catalytic reduction unit.

27. A boiler unit for incineration of tail gas, comprising:
(i) combustor comprising a vessel having a top, bottom, at least one tail gas inlet near the top of the vessel, at least one diluent inlet, an exhaust gas outlet near the bottom of the vessel, wherein gas flows generally in a top-to-bottom direction through the vessel, the combustor operable for receiving:
   (a) tail gas comprising $NO_x$, $NO_x$ precursors, or both, and
   (b) diluent of type(s) and amount(s) for controlling combustor temperature to from about 950° C. to about 1100° C., wherein the diluent is introducible in a top 33% of vessel height of the combustor, and wherein the diluent comprises at least one of (i) 25% or more on a gravimetric rate basis of total flue gas discharged from at least one process unit located downstream of said combustor, or (ii) flue gas from a tail gas burner or carbon black dryer; and
(ii) at least one selective non-catalytic reduction unit comprising at least one selective non-catalytic reduction device and a boiler, said reduction unit operable for receiving effluent discharged from the combustor and at least one NOx reducing agent or decomposition products thereof or both reactable with NOx to produce nitrogen included with flue gas discharged from the at least one selective non-catalytic reduction unit, and a recirculation line operable to return effluent discharged from reduction unit to the at least one diluent inlet of the combustor.

28. An apparatus for carbon black production comprising a carbon black furnace reactor for producing carbon black and tail gas, a filter for separating carbon black from the tail gas, and a boiler unit for incineration of the tail gas according to claim 27.

29. The apparatus of claim 27, wherein the vessel comprises a vertically-oriented combustion chamber comprising a side wall connecting the top and bottom, and a top burner located inside at the top of the chamber, which is adapted to receive fuel from an external fuel source.

* * * * *